(12) United States Patent
Biswas et al.

(10) Patent No.: US 12,399,156 B2
(45) Date of Patent: Aug. 26, 2025

(54) ACOUSTIC SIGNAL BASED ANALYSIS OF FILMS

(71) Applicant: Liminal Insights, Inc., Emeryville, CA (US)

(72) Inventors: Shaurjo Biswas, El Cerrito, CA (US); Shan Dou, Berkeley, CA (US); Aleksandr Kiessling, Berkeley, CA (US); Andrew Hsieh, Berkeley, CA (US); Barry Van Tassell, El Cerrito, CA (US); Marc Juzkow, Livermore, CA (US)

(73) Assignee: LIMINAL INSIGHTS, INC., Emeryville, CA (US)

( * ) Notice: Subject to any disclaimer, the term of this patent is extended or adjusted under 35 U.S.C. 154(b) by 0 days.

(21) Appl. No.: 17/313,878

(22) Filed: May 6, 2021

(65) Prior Publication Data
US 2021/0350818 A1 Nov. 11, 2021

Related U.S. Application Data

(60) Provisional application No. 63/020,797, filed on May 6, 2020.

(51) Int. Cl.
*G01N 29/14* (2006.01)
*G01D 11/24* (2006.01)
(Continued)

(52) U.S. Cl.
CPC ............ *G01N 29/14* (2013.01); *G01N 29/07* (2013.01); *G01N 29/2493* (2013.01);
(Continued)

(58) Field of Classification Search
CPC .... G01N 29/14; G01N 29/07; G01N 29/2493; G01N 29/26; G01N 29/27;
(Continued)

(56) References Cited

U.S. PATENT DOCUMENTS

| 9,185,513 | B1 * | 11/2015 | Hsieh ..................... H04W 4/60 |
| 2009/0286148 | A1 * | 11/2009 | Fujikawa ............ H01M 10/488 |
| | | | 429/149 |

(Continued)

FOREIGN PATENT DOCUMENTS

| CN | 109565089 A | * | 4/2019 | ............ G01N 29/07 |
| DE | 69929674 T3 | * | 1/2012 | |

(Continued)

OTHER PUBLICATIONS

Translate_JP2017045547 (Year: 2017).*

(Continued)

*Primary Examiner* — Peter J Macchiarolo
*Assistant Examiner* — Monica S Young
(74) *Attorney, Agent, or Firm* — Polsinelli PC

(57) ABSTRACT

Systems, techniques, and computer-implemented processes are provided for acoustic signal based analysis of thin-films, electrode coatings, and other components of batteries. Data analytics on signals obtained by ultrasound excitation of materials is used to analyze electrode coating parameters, analyzing separators, and other battery components. Using the disclosed techniques in battery manufacturing and production can lead to reduction in wastage of damaged/scrapped battery cells and shorten production time.

20 Claims, 35 Drawing Sheets

(51) Int. Cl.

| | | |
|---|---|---|
| *G01N 29/04* | (2006.01) | |
| *G01N 29/07* | (2006.01) | |
| *G01N 29/24* | (2006.01) | |
| *G01N 29/26* | (2006.01) | |
| *G01N 29/27* | (2006.01) | |
| *G01N 29/44* | (2006.01) | |
| *G10L 25/51* | (2013.01) | |
| *H04R 1/34* | (2006.01) | |

(52) U.S. Cl.
CPC .......... *G01N 29/26* (2013.01); *G01N 29/27* (2013.01); *G01N 29/4436* (2013.01); *G10L 25/51* (2013.01); *H04R 1/345* (2013.01); *G01D 11/24* (2013.01); *G01D 11/245* (2013.01); *G01N 29/048* (2013.01); *G01N 2203/0658* (2013.01)

(58) Field of Classification Search
CPC .......... G01N 29/4436; G01N 29/048; G01N 2203/0658; G10L 25/51; H04R 1/345
USPC .......................................................... 73/632
See application file for complete search history.

(56) References Cited

U.S. PATENT DOCUMENTS

| | | | | |
|---|---|---|---|---|
| 2012/0111103 | A1* | 5/2012 | Matsumoto | G01B 21/30 |
| | | | | 73/150 R |
| 2014/0356728 | A1* | 12/2014 | Honda | B32B 37/0053 |
| | | | | 429/246 |
| 2016/0197382 | A1* | 7/2016 | Sood | G01N 29/223 |
| | | | | 73/620 |
| 2016/0223498 | A1 | 8/2016 | Steingart et al. | |
| 2017/0002731 | A1* | 1/2017 | Wei | F24H 8/00 |
| 2018/0164383 | A1 | 6/2018 | Hsieh et al. | |
| 2019/0049518 | A1* | 2/2019 | Shen | H01M 10/48 |
| 2019/0072614 | A1* | 3/2019 | Steingart | H01M 10/4285 |
| 2019/0094189 | A1* | 3/2019 | Hsieh | G01N 29/46 |
| 2019/0207274 | A1 | 7/2019 | Ladpli et al. | |
| 2020/0329742 | A1* | 10/2020 | Tanaka | A23B 2/57 |
| 2020/0358147 | A1* | 11/2020 | Dou | G01N 29/262 |

FOREIGN PATENT DOCUMENTS

| | | | | |
|---|---|---|---|---|
| JP | S5383672 A | | 7/1978 | |
| JP | S5989791 A | | 5/1982 | |
| JP | 11-51917 A | | 2/1999 | |
| JP | H11162420 A | * | 4/1999 | |
| JP | 2008301453 A | * | 12/2008 | |
| JP | 2010-101656 A | | 5/2010 | |
| JP | 2010205678 A | * | 9/2010 | |
| JP | 2011-029084 A | | 2/2011 | |
| JP | 2012-167959 A | | 9/2012 | |
| JP | 2013-044536 A | | 3/2013 | |
| JP | 2013140680 A | * | 7/2013 | |
| JP | 2014032767 A | * | 2/2014 | |
| JP | 2016-176865 A | | 10/2016 | |
| JP | 2017-020863 A | | 1/2017 | |
| JP | 2017045547 A | * | 3/2017 | |
| JP | 2017168353 A | * | 9/2017 | .......... B05C 11/00 |
| JP | 2018-537682 A | | 12/2018 | |
| KR | 20180108268 A | * | 10/2018 | |
| WO | WO-2017223219 A1 | * | 12/2017 | .......... G01N 29/07 |

OTHER PUBLICATIONS

Translate_DE69929674 (Year: 2012).*
Translate_JP2008301453 (Year: 2008).*
Translation JP-2010205678-A (Year: 2010).*
Translation JP-2014032767 Feb. 20, 2014 (Year: 2014).*
Translate KR20180108268 Oct. 4, 2018 (Year: 2018).*
Translation JP2017168353 (Year: 2016).*
International Search Report dated Jul. 13, 2021.
Japanese Notice of Reasons for Refusal; dated Nov. 2, 2023; Application # 2022-567109.
Japanese office action; dated Aug. 29, 2024; Application # 2022-567109.

* cited by examiner

ACOUSTIC SIGNAL BASED ANALYSIS OF FILMS

CROSS-REFERENCE TO RELATED APPLICATIONS

This application claims priority to U.S. Provisional Patent Application No. 63/020,797, filed on May 6, 2020, entitled "ACOUSTIC SIGNAL BASED ANALYSIS OF FILMS FOR USE IN BATTERIES", the contents of which are fully incorporated herein by reference and for all purposes.

FIELD OF DISCLOSURE

Disclosed aspects are directed to inspection and diagnostics of thin-films, coated layers, and other materials used in electrochemical systems. More specifically, example aspects are directed to acoustic signal based analysis of thin-films, coatings, and membranes used in separators, electrodes, and other components of battery cells.

BACKGROUND

Demands on production of battery cells are on the rise owing to an increase in demand for battery cells from various industries such as consumer electronics, automotive, clean energy, etc. Thin-films and coatings, are widely used across many industries such as electronics, aerospace, medical devices, etc., and also play an important role in battery cells. For example, thin-films may be used for electrodes, separators, and other components of different types of battery cells. It is important to maintain consistency and quality in the properties of the thin-films and coated layers used in different battery cell applications. For example, thin-film consistency and uniformity is an important consideration during the manufacturing of electrodes for batteries such as lithium ion battery (LIB), lithium metal battery (LMB), etc. In some examples of manufacturing LIB/LMB electrodes, active anode and cathode electrode materials are formed in a slurry and coated or spread on a web of metallic current collector sheet to then be baked and dried. Coating the slurry uniformly on the metallic current collector is a factor in proper functioning and longevity of the LIB/LMB. Further, upon spreading the slurry onto the metallic current collectors, the metallic current collectors are compressed through a process referred to as "calendering" to obtain the desired thickness, bulk density, and porosity of the electrodes. Thus, another goal of improving battery production includes ensuring that the calendaring process step is implemented correctly.

Current approaches for inspecting the quality of electrode coatings are limited to measuring density and thickness of the electrode coatings. In some conventional inspection methods, resistivity measurements are taken across the coated electrodes to provide information about electrode coating parameters. In other conventional inspection methods, optical methods may be used to inspect macro-scale scratches or particle agglomeration. X-ray tomography and electron microscopy methods have also been used (primarily in research and development settings or laboratory environments) to study electrode coating properties.

However, these inspection methods are time consuming and energy intensive.

BRIEF DESCRIPTION OF THE DRAWINGS

The accompanying drawings are presented to aid in the description of various aspects of the present disclosure and are provided solely for illustration and not limitation.

DETAILED DESCRIPTION

Figure 1:
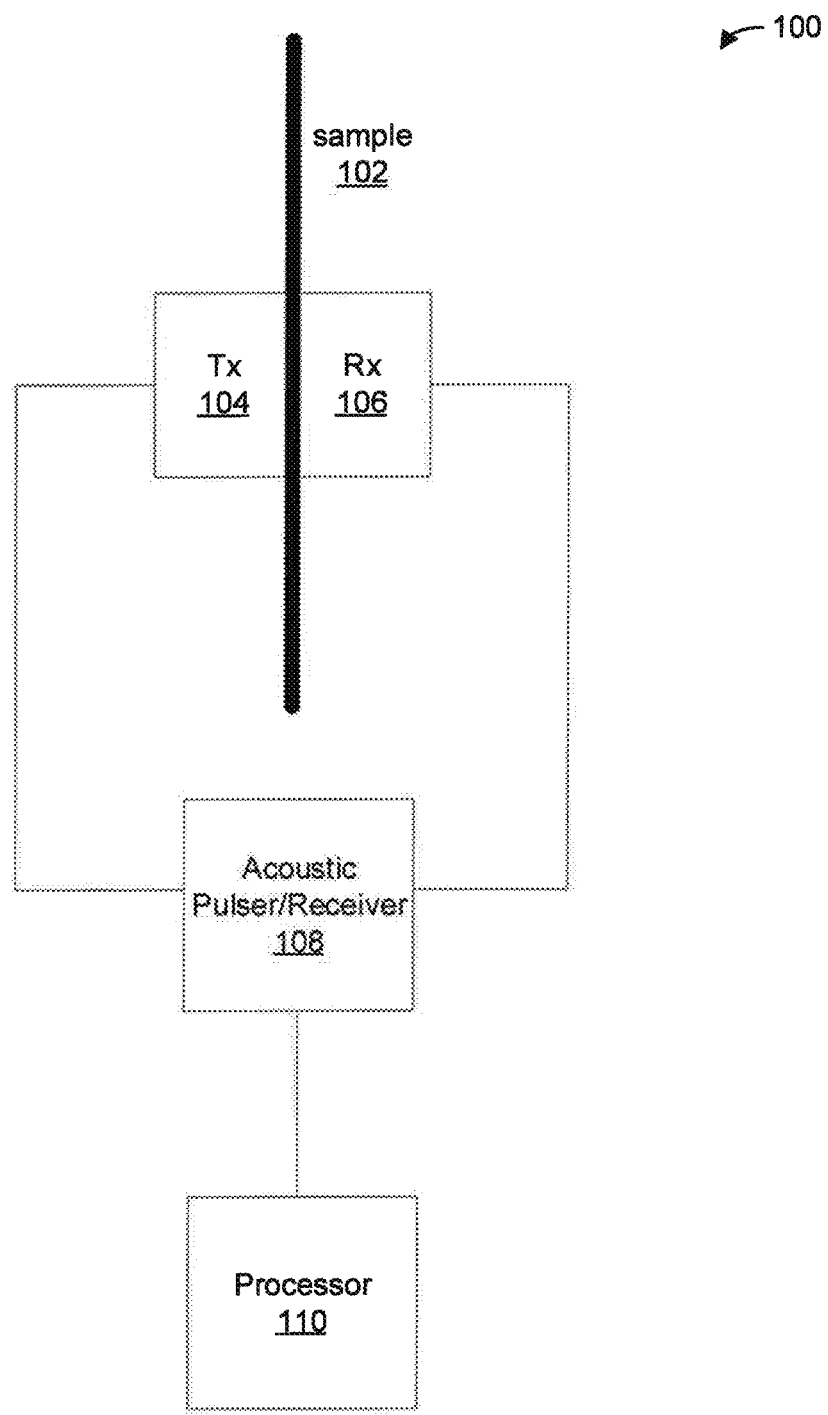
FIG. 1 illustrates an apparatus for acoustic signal based analysis of a sample, according to aspects of this disclosure.

Aspects of the present disclosure are disclosed in the following description and related drawings. Alternate aspects may be devised without departing from the scope of the present disclosure. Additionally, well-known elements of the present disclosure will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects of the present disclosure" does not require that all aspects of the present disclosure include the discussed feature, advantage or mode of operation.

The terminology used herein is for the purpose of describing particular examples only and is not intended to be limiting of aspects of the present disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the present disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In example aspects of this disclosure, systems, techniques, and computer-implemented processes are disclosed for acoustic signal based analysis of thin-films, electrode coatings, and other components of batteries. For example, data analytics on signals obtained by ultrasound excitation of materials is used to analyze electrode coating parameters, analyzing separators, and other battery components. Electrode coating composition parameters or quality metrics can include:

Uniform distribution of active materials to binder
Uniform mass loading and density
No agglomeration
Uniform particle size distribution
Uniform porosity and tortuosity
Good adhesion of materials to current collector
Minimal cracks or defects (on-surface and sub-surface)
Uniform thermal and electrical conductivity These composition parameters or quality metrics can be measured and analyzed by one or more processing circuitries, to determine conditions associated with coatings on electrodes, separators, thin-films in general, and/or current collectors. As a general example, deviations from ideal composition parameters or quality metrics can be determined based on a comparison of measurements from a sample thin-film to measurements from an ideal sample (e.g., a thin-film with pristine, nominal, or expected composition parameters or quality metrics).

In some examples, using the disclosed techniques in battery manufacturing and production can lead to reduction in wastage of damaged/scrapped battery cells and shorten production time. Efficient and fast battery diagnostics methods are important for increasing quality, lifetime, and manufacturing process efficiency for batteries. Furthermore, reducing energy costs (e.g., price per kilo Watt hour (kWh)) and improving repeatability are some of the objectives with regards to manufacturing and production of batteries and battery components. As an example, improved monitoring and diagnostic methods for batteries reduce costs associated with lengthy production process times (thereby reducing the amount of energy required for production), and further reduce costs associated with wasted/damaged battery components.

Disclosed platforms can use ultrasound and signal processing to assess the physical properties, composition parameters, and/or quality metrics of battery cells and components thereof in a non-invasive, efficient, and streamlined approach while overcoming the drawback of conventional technologies such as neutron imaging, X-ray based methods, teardown analysis, etc. Furthermore, the disclosed techniques can be used to analyze batteries during operation, for example, during charge-discharge cycles. In some examples, spatial imaging of the batteries in operation can be obtained, providing insight into degradation processes such as lithium plating, and valuable information such as the onset and extent of degradation. The disclosed techniques can also be used in conjunction with techniques for assessing electrolyte filling, to reveal information on the completion of the battery formation processes, thus allowing the opportunity to salvage cells which may have been scrapped due to damages and realizing other cost savings.

In example aspects, the diagnostic technologies can be used to assess battery electrodes and other battery components, as mentioned above. In the case of lithium ion batteries (LIBs), the electrode materials can include, but are not limited to, a mixture of active materials such as graphite, silicon compounds and alloys (e.g., for battery anodes), and Lithium Nickel Manganese Cobalt Oxide (NMC), Lithium Nickel Cobalt Aluminum Oxide (NCA), Lithium Cobalt Oxide (LCO) Lithium Iron Phosphate (LFP), Lithium Manganese Spinel Oxide ($LiMn_2O_4$), etc. (e.g., for battery cathode), binders such as Polyvinylidene Fluoride (PVDF), SBR and CMC, and additives such as carbon black, carbon nanotubes or surfactants (e.g., to improve conductivity or stability of the electrodes). These materials are mixed with solvents such as water for anodes and N-Methyl-2-Pyrrolidone (NMP) for cathodes in a process called mixing. A slurry obtained from the mixing is coated on current collectors to form electrodes. Since the slurry is highly viscous, proper coating is a complex and challenging process. As a result, electrode coatings may show significant differences in composition. Detecting composition differences and accordingly fabricating batteries with more homogenous electrodes can lead to increased battery lifetime and reduce aging. Furthermore, a significant proportion (e.g., 75% or a threshold proportion) of a battery costs can be material costs, which means that reducing wastage in terms of scrapped cells across the production chain can reduce overall battery costs.

Among other components of a LIB, the following thin-sheet components can be considered for constructing the LIB: the current collector, the electrode coating, the separator, and the exterior packaging constitute. Thus, if any of one of these thin-sheet components suffer from quality issues such as non-uniformity, damages, contaminations, foreign inclusions, coating-substrate debonding, or improper/leaky packaging, the safety and performance of the batteries can be severely compromised. During battery production, in-line monitoring and early capture of these quality issues are desirable for lowering scrap rate, which in turn could dramatically reduce production costs for the LIBs.

Because most of these quality issues in LIB's thin-sheet components manifest themselves as physical anomalies, the disclosed acoustic measurements are well suited for in-line inspection metrology. The following examples illustrate the thin sheet inspection technologies provided in this disclosure:

Detecting issues in separators can include the following non-limiting examples:
  Detection of parts of the separator which had been damaged during material handling or cell production, such as, holes, tears, or folds;
  Detection of production inhomogeneities like polymer agglomerates, large pores, or contaminant particles. These kinds of separator related defects due to production inhomogeneities can occur due to improper material handling, such as when too much web tension is applied or when the manufacturing setup does not have the appropriate cleanliness;
  Separator property determination/quality assessment based on determining separator porosity and uniformity across a roll, and across batches of separators.

These separator issues can specifically be detected by processing circuitry configured to determine conditions associated with the separator based on the acoustic response signal, such as a physical damage condition indicating one or more parts of the separator are damaged, have holes, have tears, or have folds, an inhomogeneity condition indicating one or more parts of the separator have polymer agglomerates, large pores, or contaminant particles, and an improper calendering condition indicating uneven porosity of the separator, improper mass loading of the separator, incorrect thickness of the separator, or non-uniformity of the separator.

Example issues that can be detected in battery electrodes include, but are not limited to:
  Wet and dry, calendared or/and uncalendared electrode coating inconsistency in porosity, local density, mass loading, particle agglomeration, and particle size distributions;
  Damages such as voids, streaks, scratches, or cracks;
  Foreign inclusions such as bubbles and contaminant particles (metallic and/or non-metallic);
  Delamination or flaking of electrode coating;
  Debonding between electrode coating and metal current collectors;
  Adhesion between Current Collector and coating;
  Subsurface variations in porosity or density that may not be detectable via optical and other inspections methods These battery electrode issues can specifically be detected by processing circuitry configured to determining conditions associated with the electrode based on the acoustic response signal, such as an improper calendering condition indicating inconsistencies in porosity, local density, mass loading, particle agglomeration, or particle size distributions. Other conditions that can be detected by processing circuitry based on the acoustic response signal include an improper cohesion condition indicating diminished cohesion between active material, conductive additive, and binder, a damage condition indicating damages comprising voids, scratches, or cracks associated with the electrode, a foreign inclusion condition indicating bubbles and contaminant particles including metallic or non-metallic particles associated with the electrode, a delamination condition indicating delamination or flaking of a coating of the electrode, and a debonding condition indicating compromised bonding between the coating of the electrode and metal current collectors.

Detecting issues in battery pouch packaging can include detection of damages like pinholes or improper seals resulting in leaks in cell sealing Aluminum foil-polymer laminate. Some damages can include inconsistent, non-uniform or missing areas of polymer melt adhesive layer (typically PP/PPa per DNP product literature), Nylon protective layer, aluminum foil layer or PET protective layer. Thus, even if there is no pinhole through all of the layers, inconsistent, non-uniform or missing areas of polymer adhesive layer, for example, if in the sealing edge area may compromise the seal integrity of the pouch cell. The above issue is seen even if there is a pinhole in the Al foil only but not the polymer layers.

Issues that can be detected in current collectors include folds, cracks, holes, and bends in current collector before electrode coating is applied, after electrode active materials are coated, after drying, and after calendering.

For detecting the above issues and performing related tasks, the disclosed technology may use one or more of the following approaches for analysis and classification of acoustic signal based waveforms:
  Analyzing acoustic signals in time domain, frequency domain, time-frequency domain, or wavelet domain. The analysis can be performed on a full waveform or parts thereof (e.g., waveform portions most sensitive to physical properties of the thin sheets);

Comparing waveforms or parts thereof with reference waveforms relevant to the analysis;

Comparing characteristic features extracted from time domain, frequency domain, time-frequency domain, wavelet domain, etc., with corresponding characteristic features obtained from reference data;

Extracting and analyzing dissimilarity metrics between test signals (e.g., signals acquired from damaged thin sheets such as electrode sheets) and reference signals (e.g., signals acquired from corresponding pristine thin sheets such as electrode sheets), where the dissimilarity metrics include metrics based on differences between the test signals and the reference signals in terms of signal features such as time-of-flight, frequency content, amplitudes, spectrogram, etc.;

Summarizing relevant acoustic metrics into an index such as a "thin-sheet quality index", which provides a measure of the thin sheet's quality obtained using the above testing and analysis. In various examples, the thin-sheet quality index can be provided using various visual representations such as two-dimensional (2D) maps (e.g., with the thin-sheet quality index plotted against different metrics on different axes), one-dimensional (1D) plots (e.g., a time series variation of the thin-sheet quality index over time), etc.; In production settings, an alert can be generated based on any unexpected deviations or anomalies in the thin-sheet quality index, where the alert can assist operators in quickly identifying and potentially rectifying possible damages in the thin-sheets during production phases, for example.

Example systems and techniques for performing the above-noted analysis can include the following:

Use of ultrasonic waves with frequencies above 0.02 MHz;

Measurement of thin sheets with ultrasound through modes involving contact with samples of the thin sheets or in non-contact modes;

Measurements of thin sheet samples in broad band resonance sweep mode or single frequency transmission mode;

Connections of transducers to the thin sheet samples using solid couplants, liquid couplant, or combinations thereof;

Attachment of transducers to the thin sheet sample using pressing techniques such as pneumatics which actuates transducers, compression of counter pieces, compression using foil tension, etc.;

Acoustic measurement processes performed continuously or discontinuously;

Use of fingertip or roller transducers as source and receiver of ultrasonic waves;

Analysis of electrodes as a whole or selectively focusing on areas of interest;

Raster scanning the transmitter and receiver sensors across the thin sheet samples to desired spatial resolution and speed of measurement;

Use of one or more single element acoustic sensors or one or more arrays of ultrasound sensors/transducer to obtain complete or partial coverage of the thin sheet samples;

Use of a range of technologies in tandem to assess the quality of electrodes or battery components. Such technologies can have sensors embedded in rollers that make contact with coated electrodes or can be non-contact sensors that analyze the coated films as they pass by. Examples of these methods include:

Ultrasound based analysis methods to assess quality and composition of films and coating, etc.;

4-point probes to measure film/coating conductivity, resistivity, etc.;

Strain gage sensors to measure stress/strain on thin-film samples;

Optical measurements to assess film/coating thickness;

Beta-ray sensors to assess film/coating mass loading and coating weight profile;

Thermal imaging to assess film quality and impurities in coatings.

FIG. 1 shows an example system 100 for analyzing a sample 102 using acoustic signals according to this disclosure. The sample 102 can include any suitable battery component such as thin-films, separators, electrode materials, coated sheets, current collectors, etc. The system 100 (apparatus 100) can include a transmitting transducer Tx 104 or other means for sending excitation sound signals into the battery cell or components (e.g., for transmitting a pulse or pulses of ultrasonic or other acoustic waves, vibrations, resonance measurements, etc., through the battery cell). The system 100 can further include a receiving transducer Rx 106 or other means for receiving/sensing the sound signals, which can receive response signals generated from sound signals transmitted by the Tx transducer 104. The transmitted signals from the Tx transducer 104, from one side of the sample 102 on which the Tx transducer 104 is located may include input excitation signals. Reflected signals, e.g., from another side of the sample 102 may include echo signals. It is understood that references to response signals may include both the input excitation signals and the echo signals. Further, the Tx transducer 104 may also be configured to receive response signals, and similarly, the Rx transducer 106 may also be configured to transmit acoustic signals. Therefore, even though separately illustrated as Tx and Rx, the functionalities of these transducers may be for both sending and receiving acoustic signals. In some examples, even if not specifically illustrated, one or more Tx transducers and one or more Rx transducers can be placed on the same side or wall of the sample 102, or on different (e.g., opposite) sides of the sample 102.

An acoustic pulser/receiver 108 can be coupled to the Tx and Rx transducers 104 and/or 106 for controlling the transmission of acoustic signals (e.g., ultrasound signals) and receiving response signals. The acoustic pulser/receiver 108 may include a controller (not separately illustrated here) for adjusting the amplitude, frequency, and/or other signal features of the transmitted signals. Such controller may be manually adjustable or may be communicatively coupled to a processor (e.g., processor 110) for remote and/or automatic adjustments. The acoustic pulser/receiver 108 may also receive the signals from the Rx transducers 106. In some examples, the acoustic pulser/receiver 108 may be configured as a combined unit, while in some examples, an acoustic pulser for transmitting excitation signals through the Tx transducer 104 can be a separate unit in communication with a receiver for receiving the signals from the Rx transducer 106. A processor 110 in communication with the acoustic pulser/receiver 108 may be configured to store and analyze the response signal waveforms according to this disclosure. Although representatively shown as a single processor, the processor 110 can include one or more processors, including remote processors, cloud computing infrastructure, etc.

Although not explicitly shown in FIG. 1, more than one Tx transducer and/or more than one Rx transducer can be placed in one or more spatial locations across the sample 102. Using multiple Tx/Rx transducers can allow for studying a spatial variation of acoustic signal features across the sample 102. A multiplexer can be configured in communication with the acoustic pulser/receiver 158 for separating and channeling the excitation signals to be transmitted and the response signals received. Further in some examples, a battery cycler can be used for charging and discharging a battery comprising the sample 102 to study the sample 102 during operation of the battery, e.g., under various charge conditions or states of charge. In some examples, various couplants can be used (e.g., solid, liquid, or combinations thereof) for making or enhancing contact between the Tx and Rx transducers 104, 106 and the sample 102. Furthermore, various attachment mechanisms (e.g., pneumatic, compression, screws, etc.) can also be used for establishing or enhancing the contact between the Tx and Rx transducers 104, 106 and the sample 102.

In some examples, a reference model can be generated using one or more reference battery cells. A selected arrangement of one or more transmitters and one or more receivers of acoustic signals can be used for acoustic signal analysis of the one or more reference battery cells. In some examples, a set of one or more metrics may be used for generating a reference model against which other samples may be measured. For example, a selected combination of one or more acoustic signal features and optionally, one or more non-acoustic data points for a reference battery (where the combination of metrics may be collected at a single time instance or at two or more time instances over a period of time) may be used for generating the reference model. Corresponding metrics of a test sample may be measured against and compared to the reference model's metrics. The measurements or comparisons can reveal deviations of certain characteristics of the test sample from those of the reference model. These deviations can be used to determine, estimate, or predict the one or more states of the test sample. The metrics as well as the reference models can be dynamically updated as more data is collected from test samples. In some examples, learning tools such as machine learning and artificial intelligence can be used in dynamically updating the reference model.

Figure 2A:
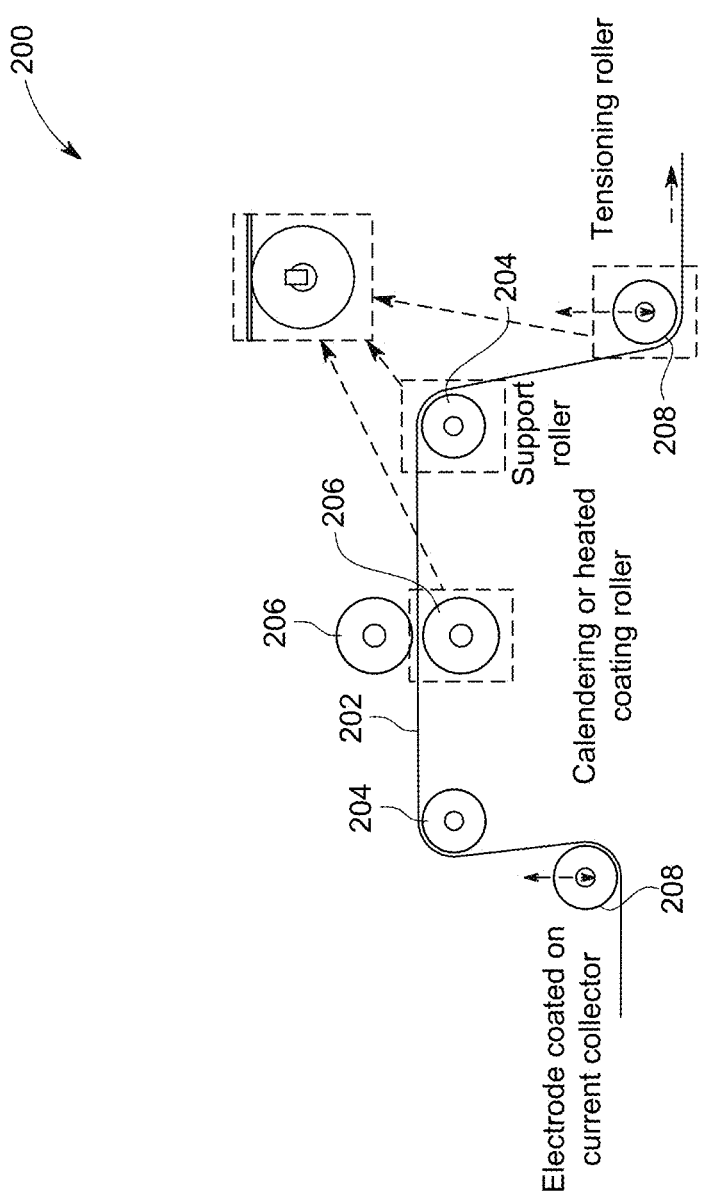
FIGS. 2A-D illustrate the use of rollers in acoustic signal based analysis of a thin-film sample, according to aspects of this disclosure.

FIG. 2A illustrates an example system 200 implementing aspects of this disclosure. A thin-film 202 shown in the system 200 can include an electrode material coated on a current collector. Properties of the thin-film 202 may be studied using acoustic signal based analysis. The thin-film 202 is processed during electrode and battery cell fabrication steps using various rollers, among other tools. Different types of rollers are illustrated, including support rollers 204, tensioning rollers 208, and calendaring or heated coating rollers 206 (keeping in mind that other types of rollers and/or arrangements can be used without deviating from the scope of this disclosure). In example aspects, one or more of the rollers 204, 206, 208 can be configured to include transducers (e.g., transmit and/or receive transducers such as Tx and Rx transducers 104, 106). For example, one or more of the rollers 204, 206, 208 can be designed to house transducers or other means for transmitting and/or receiving acoustic signals which can be used to measure the acoustic properties of the thin-film 202.

In some examples, as will be described with reference to FIGS. 2B-D below, the acoustic signal based measurements can be obtained on thin-films having wet or dry electrode coatings. In some examples, the thin-film 202 can have coatings on either or both sides. The transducers provided in the rollers 204, 206, 208 can be used for obtaining measurements on the coating side and/or the current collector side of the thin-film 202. The transducers can include one or more single element transducers or one or more arrays of transducers, embedded within one or more of the rollers 204, 206, 208. In addition to, or as an alternative, to the transducers, one or more acoustic sensors, or other types of sensors can also be built into the rollers. In some examples, sensors for a 4-point probe for film conductivity measurement, thermal sensors for detecting impurities, or other sensors can be included in the rollers. In some examples, separators can have a ceramic coating, where acoustic signal (e.g., ultrasound) based analysis can be used to measure aspects such as mass loading, thickness, or uniformity of the ceramic coating layer.

Figure 2B:
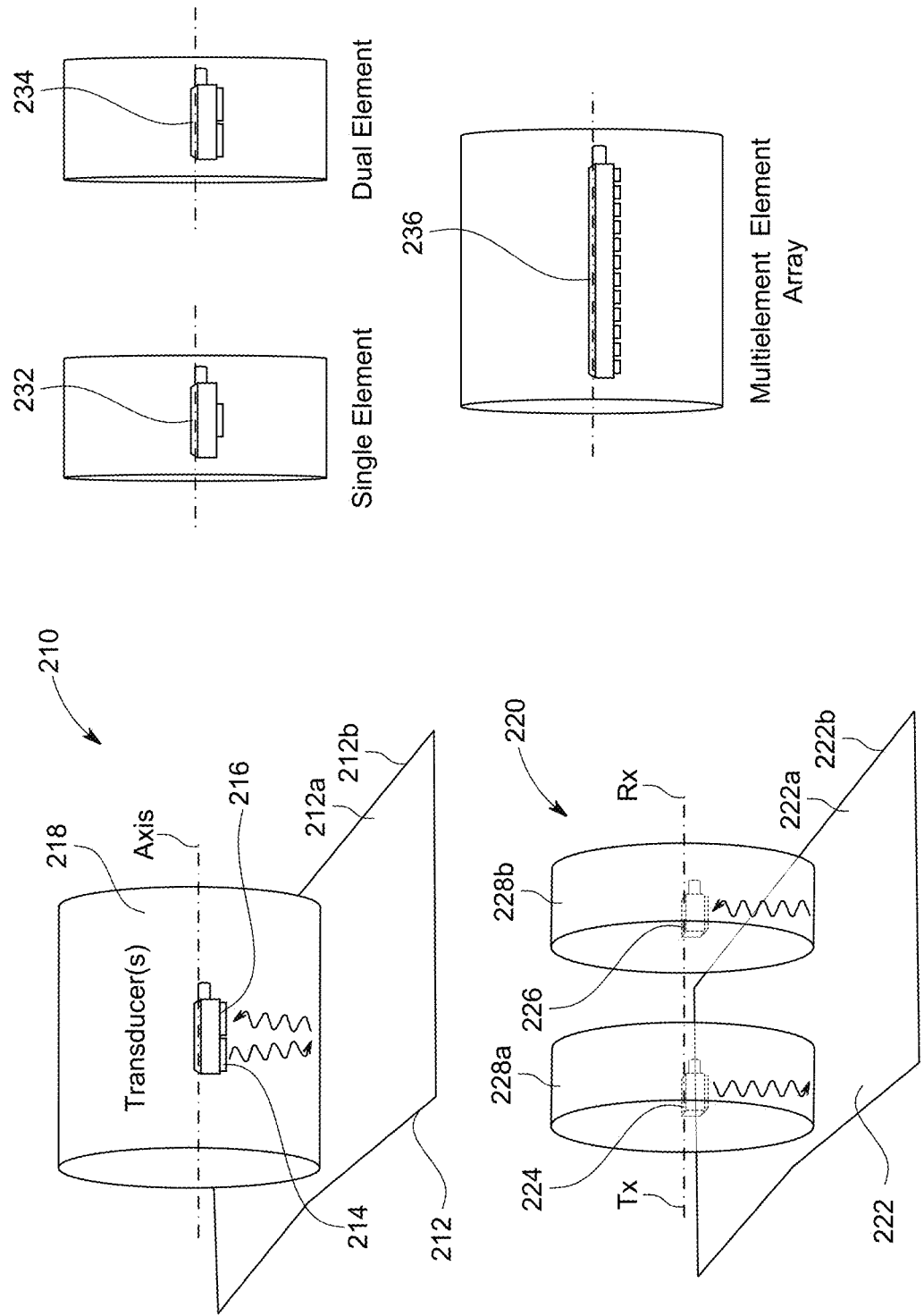

FIG. 2B shows a system 210 with a thin-sheet or thin-film sample 212, which includes a coating 212a on a current collector 212b. The coating 212a, when initially applied on the current collector 212b can be in the form of a slurry, where the slurry may be wet. The current collector 212b can be a long continuous sheet of a uniform width. The coating 212a in the form of the slurry can be spread on the current collector 212b, along the length of the current collector 212b, but possibly of a smaller width than that of the current collector 212b. The larger width of the current collector 212b can allow a narrow channel of uncoated material on either side (in the width direction) of the current collector 212b upon the coating 212a being applied. The narrow channels can accommodate any run off or spreading of the wet slurry as the coating 212a is subjected to further processing steps such as drying to produce a dry coating.

A roller 218 is shown along a width direction (e.g., an axis of the roller 218 of a cylindrical shape can be in parallel with the width direction of the sample 212), as the sample 212 can be conveyed along the roller 218 along the length of the sample 212. The roller 218 can house or accommodate two transducers, including a Tx transducer 214 and an Rx transducer 216. The Tx transducer 214 and the Rx transducer 216 can be designed in various configurations, where in an example, they are shown to be positioned in proximity to the axis of the roller 218. The Tx transducer 214 can transmit ultrasound/acoustic signals through the roller 218 to be incident on the sample 212. The transmitted acoustic signals can travel through any portion of the sample, which can be controlled using the angle of incidence, proximity of the transducers to the sample 212, use of wave guides, or other configurations which will be explained in detail in the following sections. The Rx transducer 216 can receive response acoustic signals which are responsive to the transmitted acoustic signals. In an example where the Tx transducer 214 and the Rx transducer 216 are located on the same side of the sample 212, the response signals can include reflections of the transmitted acoustic signals.

The system 220 of FIG. 2B illustrates another example configuration with a sample 222 similar to the sample 212 (the sample 222 can include a coating 222a and current collector 222b). A Tx transducer 224 may be disposed in a roller 228a and an Rx transducer 226 may be disposed in a roller 228b, where the rollers 228a-b may be different rollers or portions of the same roller. In the configuration shown in the system 220, an increased separation or physical distance between the Tx transducer 224 and the Rx transducer 226 may be used to study various signal features, including, for example, acoustic signals traversing along a width direction on or through the sample 222 upon being incident from the Tx transducer 224 on the sample 222.

As seen from the above examples, the transducers (Tx and/or Rx) can be configured in various combinations, such as single element 232, dual element 234, as well as in a multi-element array 236 comprising two or more transducers. The multi-element array 236 can include a row of transducers or a two-dimensional array. These various configurations may be used to study different signal properties based on controlling various parameters related to positioning of the Tx/Rx transducers with respect to the sample (e.g., distance from the sample, sides of the sample on which the transducers are disposed), angles of the transmitted/received acoustic signals, relative positioning between Tx and Rx transducers, use of waveguides for the acoustic signals, etc.

In some examples, acoustic signal based analysis can be used to measure the wet loading of the electrode slurry after it is coated onto the thin-film/foil, but before the coated electrode is subjected to drying, e.g., in a drying oven. Analyzing the electrode with wet coating can reveal valuable insights into information such as loading variability (e.g., variations in coating/loading the wet slurry on to the current collector), variabilities or inconsistencies along a length of the electrode as it the electrode is continuously coated, detection of streaks resulting from the coating, etc.

There are some coating techniques that are more prone to side to side variability, such as coating techniques which may utilize doctor blades or reverse roll coating for loading the slurry. Loading the slurry on to the current collector typically involves mixing the slurry and storing it in a reservoir, and constantly loading the slurry from the reservoir on to the current collector through various valves and other dispensing mechanisms, e.g., through the assistance of doctor blades. The volume of the electrolyte slurry in the reservoir affects the throughput under the doctor blade. If volume changes, the loading characteristics can change (e.g., lower volume of slurry can lead to reduced loading. Detecting such potential reductions in loading can lead to early detection of any defects which may result from such inconsistencies in the loading patterns. In some examples, coating methods can include a slot-die coating, where a slurry solution may be delivered onto a substrate or current collector through a narrow slot positioned close to the surface of the substrate. In both of these coating techniques, agglomerates can get stuck under the doctor blade or in the slot resulting in streaks of uncoated current collector. Finding any of the defects listed above earlier, before subjecting the coated electrode to drying in the drying oven can allow for adjustment of the coating processes to return to uniform coating or suggest a shutdown and cleaning of a coating head from which coating is deposited on to the substrate. If analysis is delayed until after the coated electrode has been processed through the drying oven, there is an increased risk of damaged electrodes, leading to waste of slurry and current collector materials.

In some examples, as will be described with reference to FIG. 2C below, acoustic signal based testing can be performed in a non-invasive manner during various stages of an electrode formation, including before deposition of the slurry, after deposition of a wet coating/slurry on one side of the electrode, after deposition of a wet coating/slurry on another side of the electrode, etc., before the wet coatings are allowed to dry. A pulse-echo ultrasound mode or other suitable mode can be employed in the acoustic signal based analysis, using transducers provided in one or more rollers used in assisting the movement of the electrode material thin-film through the various processes.

It is noted that the use of transducers in rollers for the acoustic signal based analysis on wet coating, if performed on two sides having been coated, is challenging. For example, performing the measurements on the second side of the current collector (after a first side of the current collector has already been coated) may be challenging because the rollers may be designed to be in contact with the first side and not the current collector during the measurements on the first side. To overcome such challenge, acoustic signal based analysis may be performed in a step-wise manner by coating the first side, analyzing the wet coating on the first side, and then coating the second side to subsequently perform analysis on the second side before the collector with coating on both sides is subjected to drying in the drying oven.

Figure 2C:
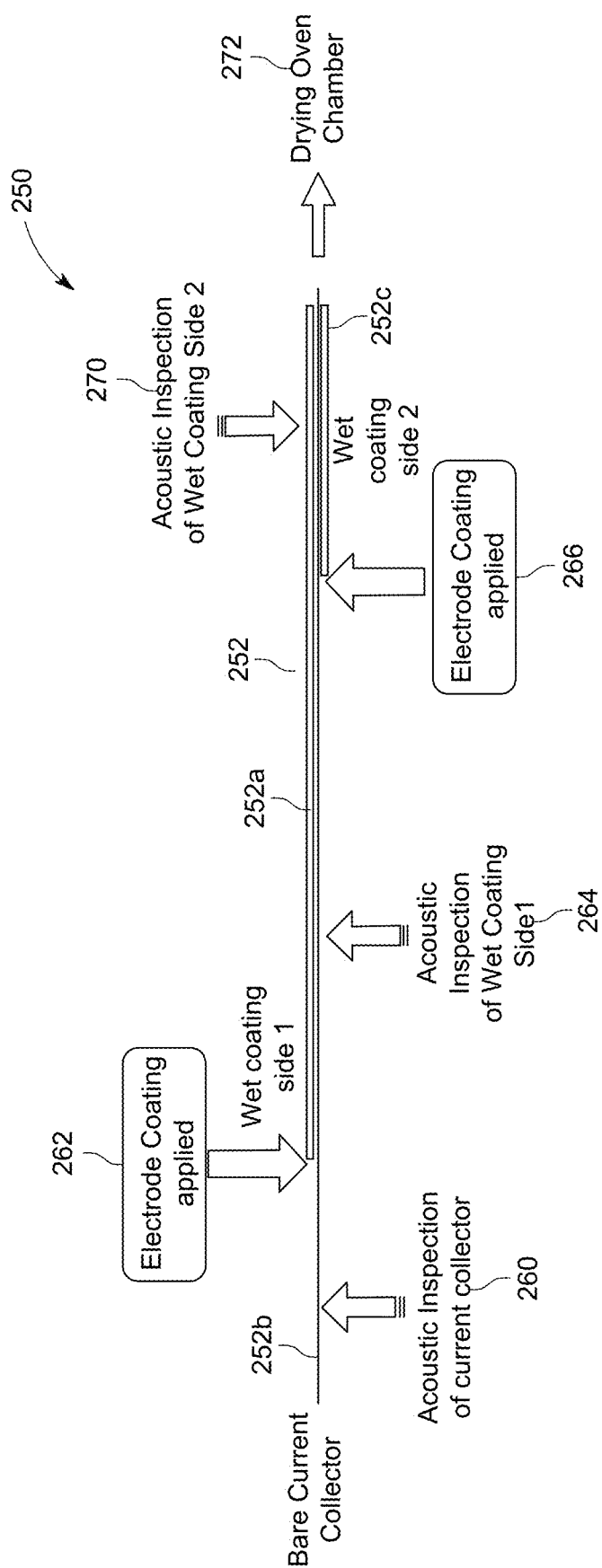

FIG. 2C illustrates a process 250 for acoustic signal based inspection and analysis of a sample during electrode fabrication using the various above-described arrangements of transducers or suitable variations thereof. For example, the use of transducers such as those disposed in rollers can be adapted to the acoustic signal based analysis of a thin-film sample during various stages of production. In an example where a sample 252 is a thin-film electrode having a bare current collector 252b, acoustic inspection of the sample 252 can be conducted at various stages such as application of wet electrode coatings 252a and 252c on either side of the current collector 252b, and subsequent stages of their drying to lead to dry coatings. Although not specifically illustrated in FIG. 2C, any configuration of transducers such as those disposed in the rollers discussed with reference to FIGS. 2A-B may be used in the various stages of acoustic inspection involved in the process 250.

For example, step 260 can include a time instance or time period in which the bare current collector 252b can be analyzed using acoustic signal based analysis to reveal any potential defects before coating is applied. For example, a system of rollers can be used for conveying a sheet of the bare current collector 252b towards subsequent process machinery/equipment.

At step 262, electrode coating 252a can be applied as a wet coating or slurry on a first side of the bare current collector 252b. At step 264, acoustic inspection of the wet coating on the first side can be performed during a period of time to analyze any potential defects in the electrode coating 252a and/or the combination of the bare current collector 252b and the electrode coating 252a, before electrode coating is applied on the second side of the bare current collector 252b.

At step 266, electrode coating 252c is applied on the second side of the bare current collector 252b. At step 270, acoustic inspection of the wet coating on the second side can be performed during a period of time to analyze any potential defects in the electrode coating 252c, and/or the combination of any one or more of the three layers of the sample 252 comprising the electrode coatings 252a, 252c, and the bare current collector 252b.

At step 272, the sample 252 comprising the electrode coatings 252a, 252c, and the bare current collector 252b can be conveyed towards a drying oven chamber, possibly with the use of further rollers. Transducers incorporated in one or more of these further rollers can be used to carry out similar acoustic signal based analyses on the sample 252 as the electrode coatings 252a, 252c dry.

Figure 2D:
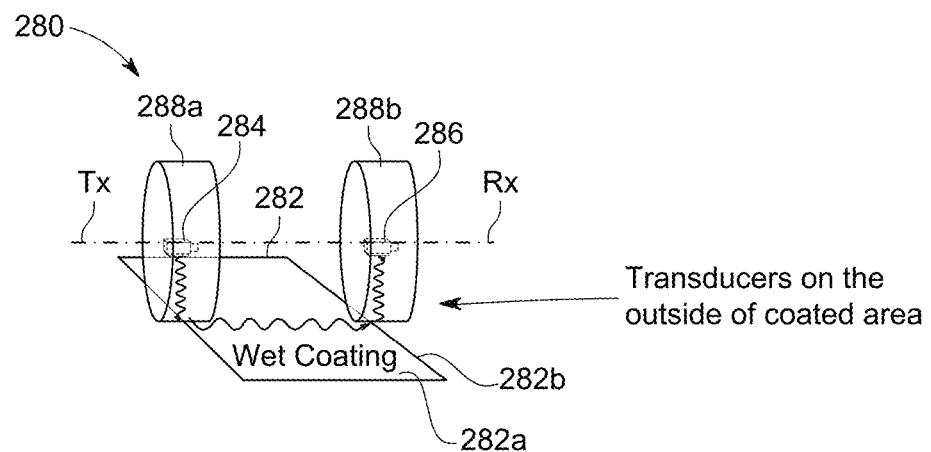

FIG. 2D shows an example system 280 with a sample 282, similar to the sample 252. The sample 282 shows a wet coating 282a on a current collector 282b. The wet coating 282 can represent any of the electrode coatings discussed above prior to the electrode coatings being fully dried to yield dry electrode coatings. Since the wet coating 282a is wet, making direct contact between the wet coating 282a and rollers can result in damage or undesirable effects to the wet coating 282a and/or the rollers. Thus, the arrangement shown in the system 280 can be used for rollers 282a-b used in housing the transducers 284 and 286, for example, to avoid any such potential damage. The rollers 282a-b can make contact with the boundaries (e.g., the aforementioned narrow channels along the length) of the current collector 282b, largely or completely avoiding contact with the wet coating 282a. As illustrated, signals traversing the width of the sample 282 be studied in this configuration, among other acoustic signal based analysis.

Figure 3A:
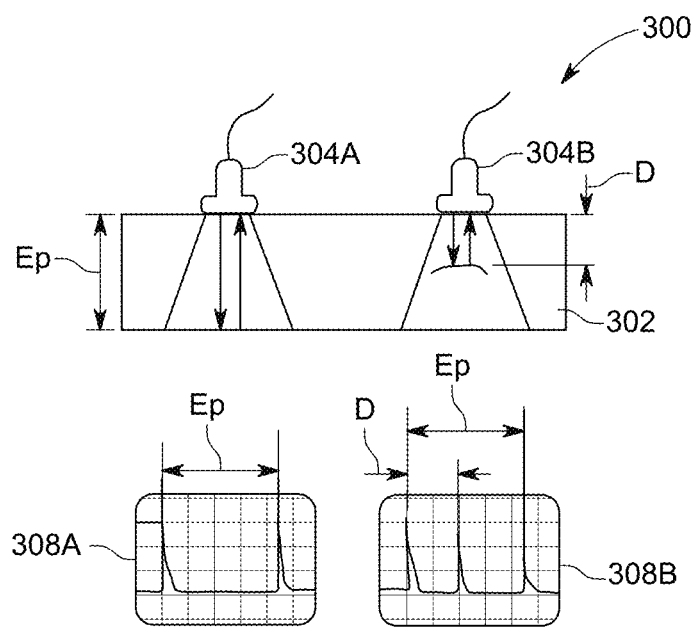
FIGS. 3A-B illustrate various modes and configurations of transducers used in detecting defects in a sample using acoustic signal based analysis, according to aspects of this disclosure.

FIG. 3A illustrates an example system 300 for detecting defects using the acoustic signal based analysis techniques according to aspects of this disclosure. An electrode 302 coated with an electrode materials as discussed above can be evaluated with ultrasound signals to detect if any defects are present. Defects can include any change in material properties like inhomogeneities, corroded parts, contaminant particles, cracks, among others. For example, the defects can be present in the electrode coatings (wet or dry) and/or the current collector, in the examples of thin-films used for battery electrodes. In other examples, the defects can be present in any thin-film (e.g., separator) or other battery component, where the defects may be introduced in any stage of the manufacturing/fabrication of the thin-film.

Devices 304A and 304B can each include ultrasonic pulse generators and sensors (which can be the same as Tx 104 and/or Rx 106 of FIG. 1), and can be configured to transmit ultrasound signals into the electrode 302 and receive response signals. As previously mentioned, there can be different modes or configurations in which acoustic signal based analysis can be performed using transmitted signals and response signals. For example, in a pulse-echo mode, the devices 304A and 304B can transmit ultrasound signals (pulse) from one side of the electrode 302 and receive reflections (echo) to study a round trip travel time for the signals. The reflections can be from an opposite wall (travel distance Ep from the device 304A) a shortened distance (travel distance D from the device 304B to the defect). Detecting a defect can involve comparing the reflected waves using time-of-flight (ToF) and amplitude measurements. The presence of a defect reduces time-of-flight because of the shorter travel distance D. The amplitude of the signal corresponding to a travel distance Ep is reduced because a fraction of the energy is reflected by the defect. ToF is calculated using Equation (1) below. In some pulse-echo measurements, the electrode 302 or other sample can be accessed on a single side and the same device (e.g., 304A or 304B) can be used for both transmitting the ultrasound signals and receiving their corresponding responses.

$$ToF = \frac{D}{c_i} \quad (1)$$

The amplitudes of the response signals in the graphs 310A and 310B illustrate the presence of the defect, due to the shorter time-of-flight. In some examples, the devices 304A and 304B can be the same device (including a transmit transducer and a receiver sensor), placed on multiple locations or on multiple samples to obtain measurements from at least two samples, one without defects (or known defects) and one with an unknown defect.

Figure 3B:
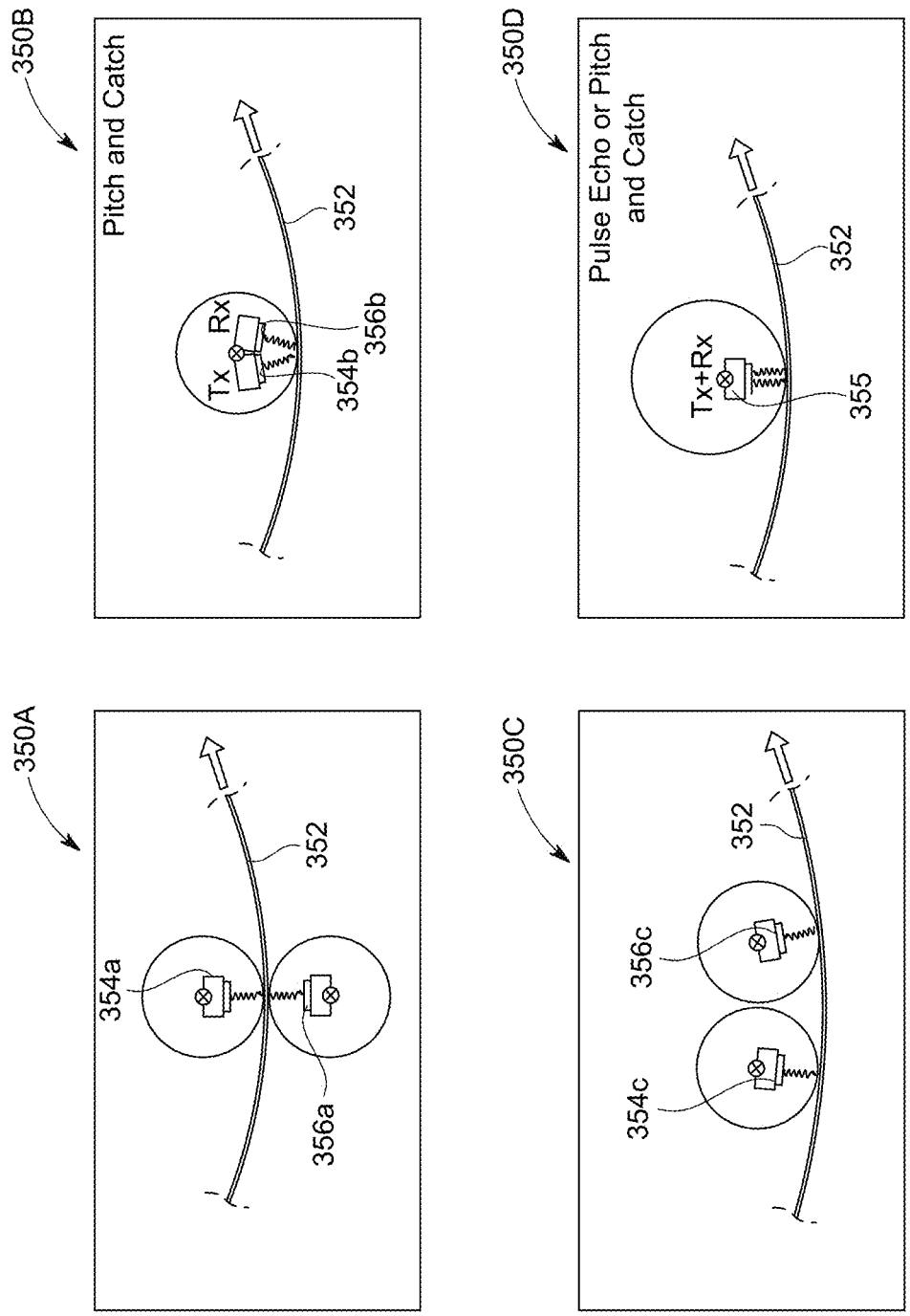

FIG. 3B illustrates various example modes used in setups 350A-D in which the acoustic signal based analysis may be performed. In the setup 350A, a through-transmission mode measurement is shown where transducers (e.g., one or more Tx transducers 354a and one or more Tx transducers 356b) may be placed on opposite sides of a sample 352 (e.g., a thin-film electrode with a coating and current collector). It is noted that FIG. 1 shows another example of the through-transmission mode, where, as previously discussed, the Tx and Rx transducers 104, 106 are on opposite sides of the sample 102, with the Tx transducer 104 serving as the pulser and the Rx transducer 106 serving as the receiver of acoustic signals. Defect detection in the through-transmission mode can be performed by comparing signal characteristics (e.g., amplitude) of acoustic signals obtained from a defect-free sample and similar signal characteristics obtained from a defective sample. The defective sample would yield response signals collected at the Rx transducer 356a being of a smaller amplitude because of reflection of transmitted back or dispersed from the defect. Defects may be characterized by their signal amplitude and subsequently detected waves. Furthermore, defective material may show different attenuation characteristics thus causing differences to appear in the Fourier transform as a centroid frequency.

Setup 350B illustrates a pitch and catch mode which can be a variation of the pulse-echo mode described with reference to FIG. 3A. In the pitch and catch mode, reflections from acoustic signals transmitted from a Tx transducer 354b can be received by an Rx transducer 356b, where there may be correspondence between the transmitted signals (pitch) and reflected signals received (catch) which are being studied. To facilitate this mode, the Tx and Rx transducers 354b and 356b, respectively, may be placed on the same side of the sample 352, and at an angle where the reflections from the transmitted signals from the Tx transducer 354b and can be received by the and Rx transducer 356b. Setup 350C illustrates another example where the Tx transducer 354c may be on the same side of the sample 352 as the Rx transducer 356c, but these transducers may be physically separated to allow the capture and analysis of signals having traveled laterally through at least a portion of the sample 352. In the setup 350D, a pulse-echo or a pitch and catch mode may be supported by the same transducer configured to both transmit and receive acoustic signals. For example, the Tx/Rx transducer 355 may transmit acoustic signals or pulses to be incident on the sample 352, timed with a separation between consecutive transmitted signals to allow receiving responses to these transmitted signals by the same Tx/Rx transducer 355.

In some examples, the samples can be excited by an acoustic signal to their resonance frequency. Defects in the sample can results in different resonance behavior and thus a change in the signal which can be detected using the acoustic signal based analysis.

Figure 4A:
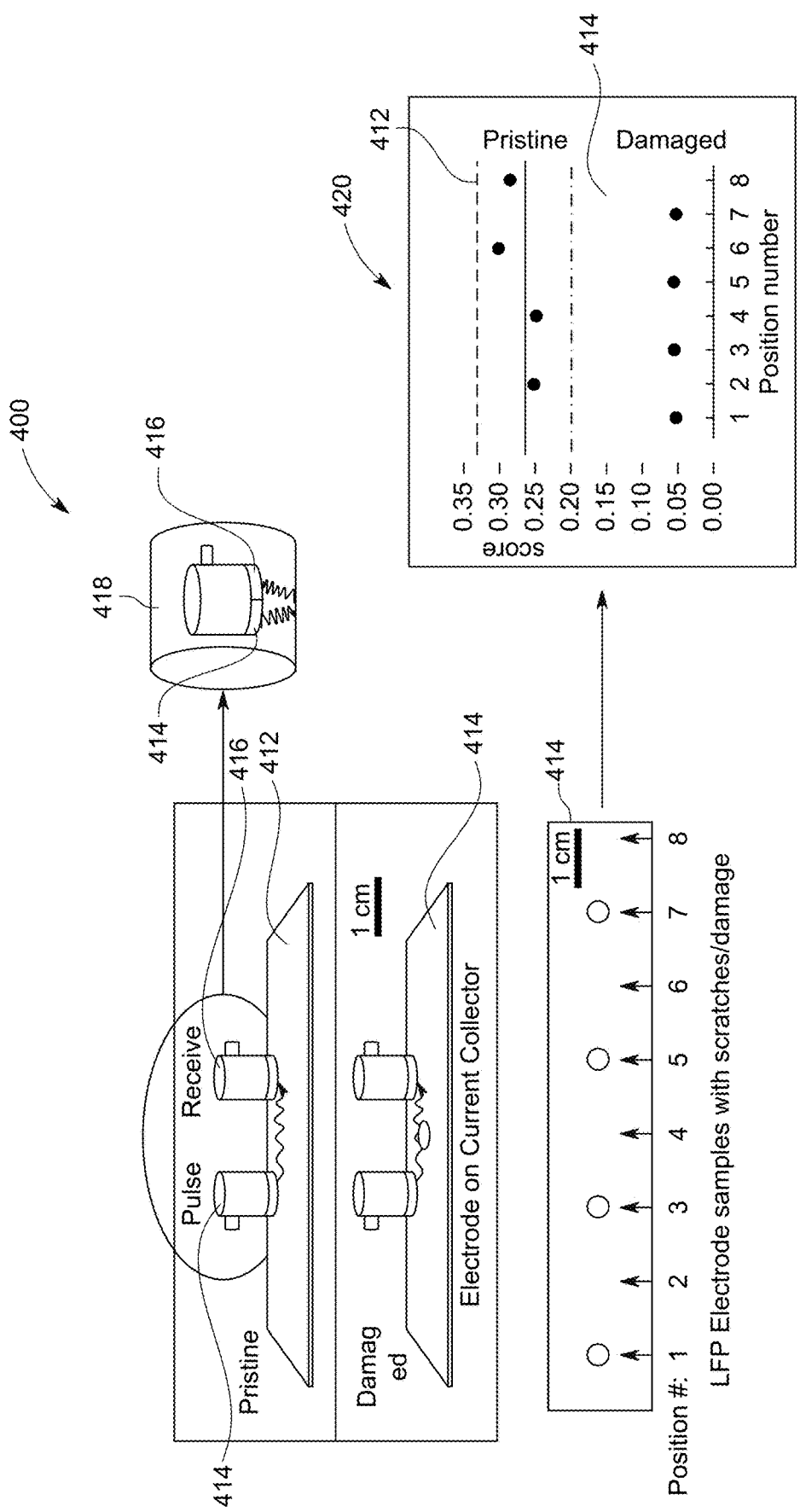
FIGS. 4A-B illustrate the use of transducers in rollers for detecting defects and comparing damaged samples to pristine samples using a quality score, according to aspects of this disclosure.
Figure 4B:
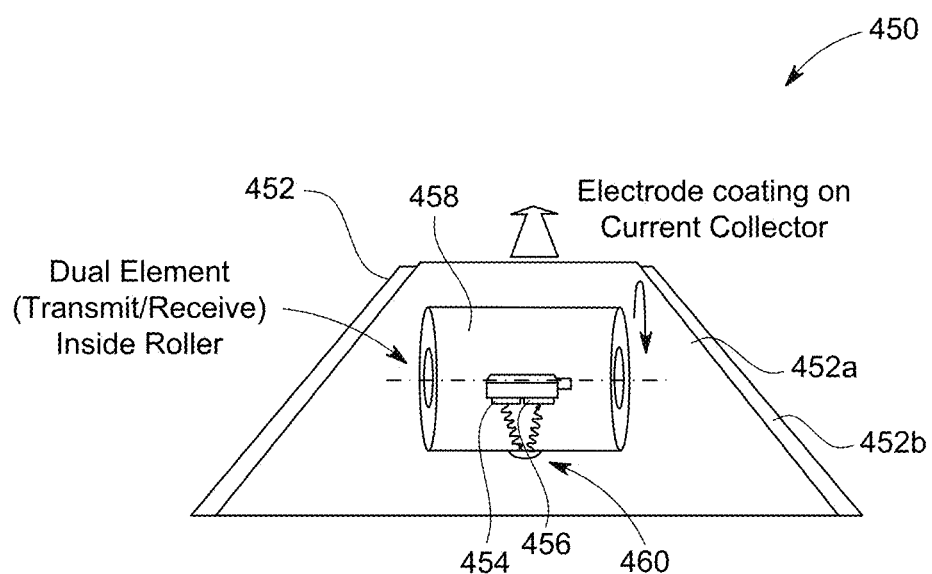

FIGS. 4A-B illustrate examples of techniques which can be used to identify defects in a thin-film using the aforementioned modes and configurations of transducers. In system 400, a Tx transducer or pulser 414 can transmit acoustic signals into one or more samples, while an Rx transducer or receiver 416 can receive response signals (noting that the response signals may be responsive to the transmitted acoustic signals in any of transmission modes). The pulser 414 and the receiver 416 can be disposed in a roller 418 in some examples, as noted above. The samples can include a pristine sample 412 (or any other reference sample of known characteristics) and a damaged sample 414 (or any other test sample of unknown characteristics).

The use of rollers can allow the samples 412 and 414 to be passed or conveyed along a length direction to allow acoustic measurements to be taken at various points along the length direction, while the rollers may remain in the same position and rotate along their axes. For example, the roller 418 can remain anchored at a particular location and rotate along its axis while various positions such as positions 1-8 of the samples make contact with the roller 418 or come in close proximity of the roller 418 (e.g., such as within a threshold proximity of the roller 418) when direct contact may not be desirable such as when the electrode coating is wet. In some examples, the threshold proximity may be a configurable parameter determined based on experiments and/or empirical studies (e.g., 1 millimeter, 2 millimeters, etc.).

A plot 420 of characteristics can be obtained at each of the positions 1-8 for both of the samples 412 and 414, to be compared. A score shown (e.g., thin-film quality index or other) on the y-axis of the plot illustrates a particular metric derived from analyzing acoustic signal characteristics at a particular position. In an example, positions 1, 3, 5, and 7 may have defects in the damaged sample 414, while the pristine sample 412 may be defect free, including in those positions 1, 3, 5, and 7. Accordingly, the scores in plot 420 for the pristine sample 412 and the damaged sample 414 would be correspondingly different, at least at these positions 1, 3, 5, and 7.

FIG. 4B illustrates a system 450 which may be used to identify defects such as the above-mentioned defects in a sample. As shown, a roller 458 can include at least a Tx transducer 454 and an Rx transducer 456, where the roller 458 can rotate on its axis while allowing (and possibly assisting) the movement of a sample 452 along a lengthwise direction. Along its course of movement, the sample 452 comes in contact with (or within a threshold proximity as defined above) to the roller 458. The Tx transducer 454 and Rx transducer 456 can continuously or periodically take acoustic measurements of the sample 452 to yield measurements at various positions (such as the positions 1-8 shown in FIG. 4A) along the length of the sample 452. The measurements at these positions can be compared with those of a reference sample (or in some cases, with measurements at other positions within the same sample 452) to identify scores and variations thereof, which may lead to the detection of defects such as the defect 460. The defects can be in the electrode coating 452a and/or the current collector 452b, and the defects at these different layers can be identified by taking measurements at various stages of formation of the sample 452 (e.g., as described with reference to the process 250 of FIG. 2C).

Figure 5A:
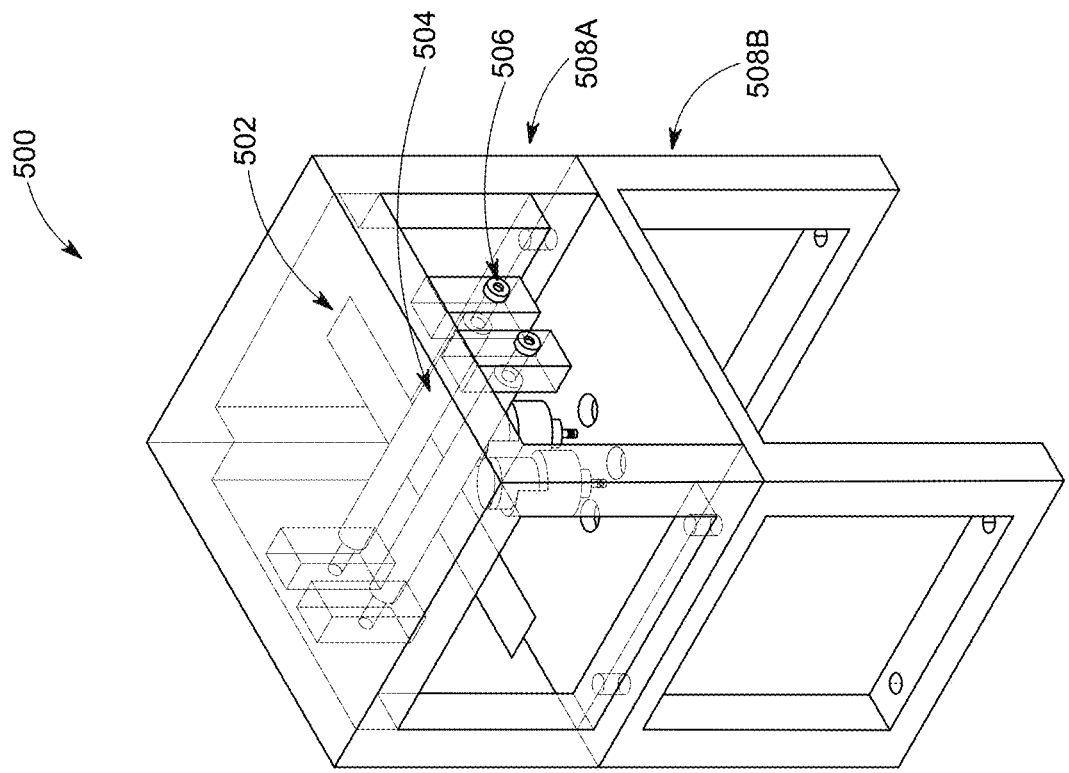
FIGS. 5A-B illustrate holder systems with rollers for use in acoustic signal based analysis of a thin-film sample, according to aspects of this disclosure.
Figure 5A:
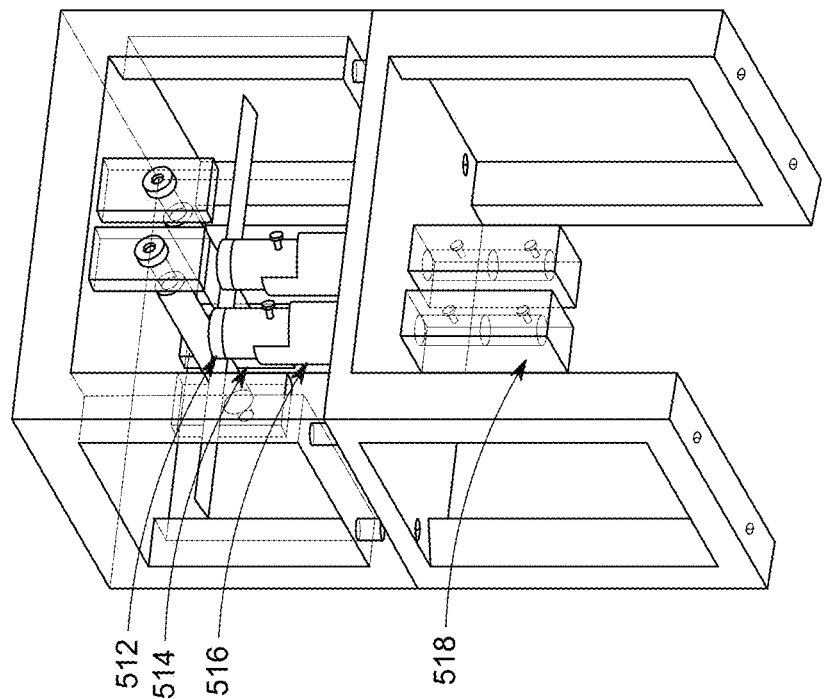
Figure 5B:
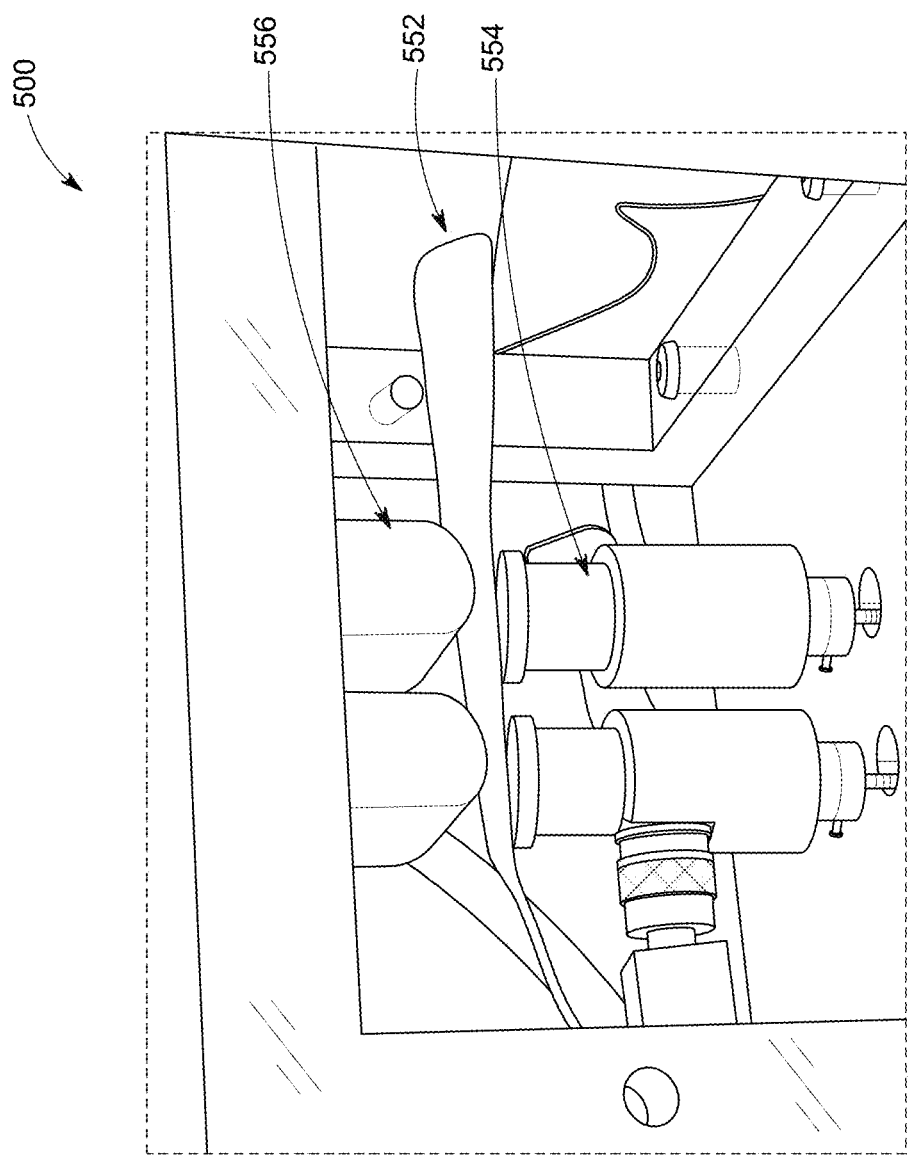

FIGS. 5A-B illustrate examples of systems or setups which can be used for acoustic analysis of thin-films, aided by one or more transducers (or other elements for transmitting and/or receiving acoustic signals) disposed within one or more rollers.

For example, FIG. 5A illustrates two views of a system 500 which can be used for detection of defects in a sample 502 such as an electrode strip or other thin-film. The system 500 includes a holder, with a holder top 508A and holder bottom 508B (noting that the designations of top and bottom of the holder are for illustrative purposes only and any of the components shown and described herein can be configured in different parts of the holder without restricting them to a top or a bottom portion). The holder shown in system 500 is an example of a holder which can be designed with relative ease using parts constructed from a three-dimensional (3D) printer. Advanced holder designs customized and optimized for particular needs in the industry are within the scope of this disclosure, and can be designed with the general concepts described herein.

As shown, the holder top 508A can include one or more rollers 504, which may be used both for moving the sample 502 through the system 500, as well as to house one or more transducers according to this disclosure. The holder top 508A can also include one or more screws 506, couplant 512, as well as one or more other transducers such as transducer 514 along with transducer holder 516. The holder bottom 508B can provide structural support (e.g., a stand) for supporting the holder top 508A, and also accommodate pneumatics 518 or other components to provide or enhance attachment/contact of the transducers to the sample 502. With the system 500, continuous acoustic signal measurements can be obtained on various locations of the sample 502 as the sample 502 is conveyed through and moved along the system 500 using the rollers 504. In some examples, the rollers 504 can include transducers for transmitting and receiving acoustic signals in a pulse-echo mode, and/or can include one set of transducers (e.g., Rx transducers) for receiving responses to acoustic signals transmitted through the sample 502 in a through-transmission mode where the transducer 514 can include another set of transducers (e.g., Tx transducers) to transmit the acoustic signals.

In an example, the setup shown in the system 500 can be designed using a 3D printed top and bottom part (e.g., the holder top 508A and the holder bottom 508B), two pneumatic actuators with transducer holders 516 and two transducers 514. Two rollers 504 can be provided on a side of the sample opposite to the side on which the two transducers 514 contact the sample 502. The rollers 504 can function as the compression counterpart and allow sufficient acoustic contact to be established between the sample 502 and the transducer 514. Since the rollers are not solidly coupled to other parts of the holder, the rollers do not propagate acoustic waves. The received signals can be considered free of any holder artefacts and the waves can be assumed to propagate only through the sample 502 in example implementations.

FIG. 5B shows another system 550 to illustrate the benefits of using the rollers as discussed above in the system 500. In the system 550, a transducer 554 is shown below the sample 552 (e.g., an electrode strip), e.g., where the transducer 554 can transmit acoustic pulses through the sample 552. A rounded cylindrical holder top 556 is shown instead of the rollers 454 in FIG. 5A. The holder top 556 is rigidly attached to the holder structure (e.g., similar to the holder top 508A). The rigid attachment can propagate or disseminate soundwaves received from the sample 552 through the holder top 556 and the rest of the holder structure, thus introducing artefacts in the received signals.

The following sections illustrate the results of analyzing various types of samples using the example techniques mentioned above. These test results include, for example:
1. Data for aluminum foil used as a sample, where the data serves as a reference for a blank sample test;
2. Data for the cathode samples under test;
3. Data for anode samples under test; and
4. Data for two special test cases: a first test case pertaining to displacement of an electrode strip across a transducer-transducer axis, and a second test case related to scanning of a pristine electrode strip.

The test results are shown in the figures discussed below where the averaged waveforms (WF) and Fourier transforms (FT) are illustrated for pristine materials and materials under test. Pristine materials refer to materials or samples with no known defects, and which may be used as reference data. The data displayed in these figures is complemented with error bars which represent one standard deviation. Furthermore, the centroid frequency is calculated for these waveforms and the magnitude of the first trough's amplitude (also referred to as the "first minimum value" or "first trough value" in the y-axis of the figures) is also determined. The centroid frequency and first trough magnitude act as a primary metric for evaluating the test samples because centroid frequency is a representative metric for shifts in the Fourier transforms and first trough magnitude is a representative metric for signal amplitude. In the figures, the amplitude of the waveforms incorporates the effects of scattering, at defects and variance in attenuation properties.

The data obtained from the tests are evaluated for a time window (e.g., selected to include a range between approximately 5 µs to 13 µs, noting that in some tests, the waveforms obtained outside this range displayed significant arbitrary variance, and so were excluded). In some cases, time windows outside the selected time window noted above are identified in a box labeled "evaluation properties" in the figures.

Differences for Pristine Cathode Coatings

Figure 6:
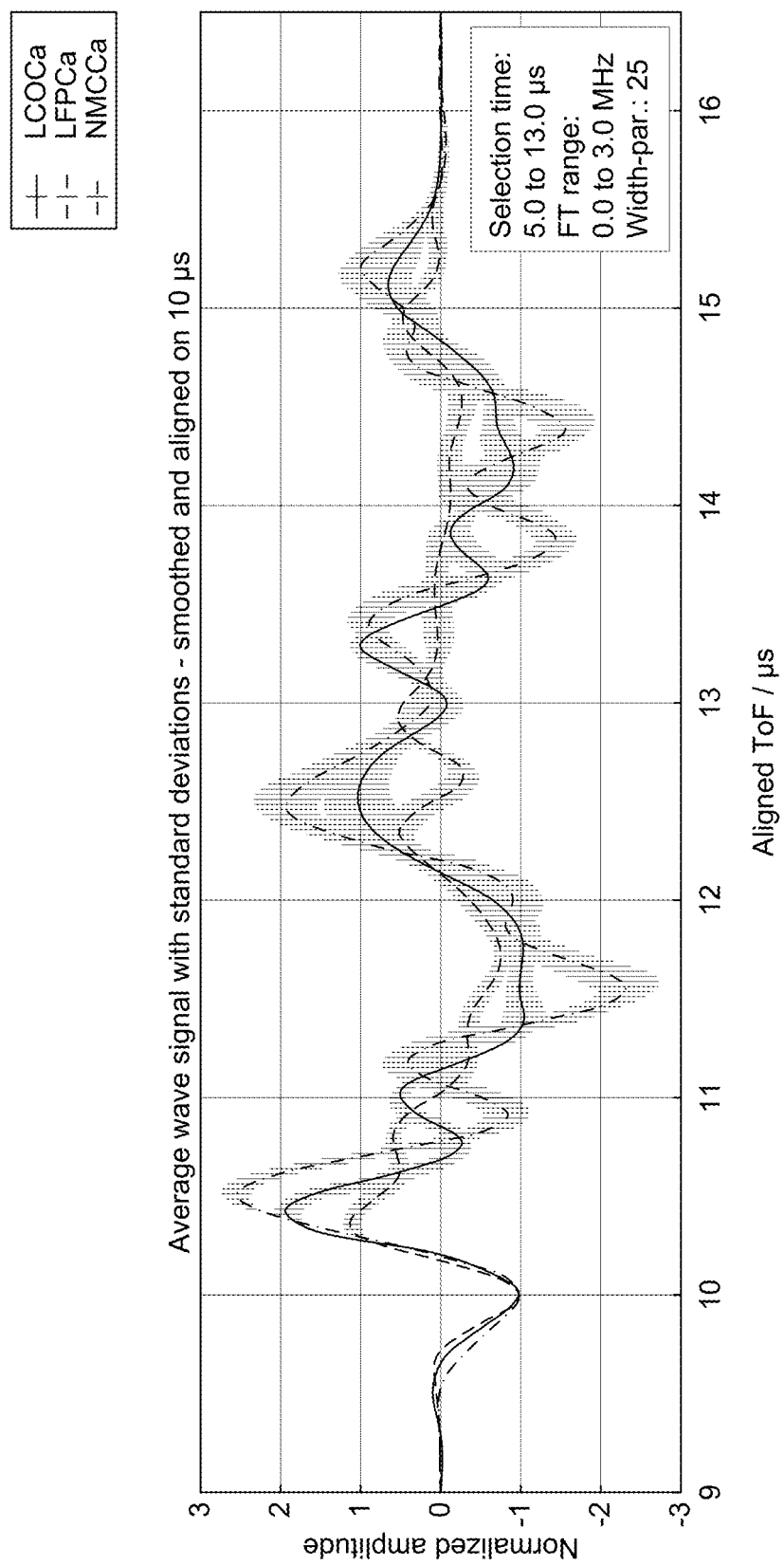
FIG. 6 illustrates waveforms obtained from acoustic signal based analysis of cathode samples, according to aspects of this disclosure.

FIG. 6 illustrates waveforms for samples of electrodes. Specifically, waveforms for electrodes coated with materials such as LCO, Lithium Iron Phosphate (LiFePO4, or "LFP"), and NMC for use in cathodes of batteries are shown. The differences for pristine cathode coatings is seen from these waveforms. These differences are useful in detecting differences between various pristine electrode coatings. For example, the normalized amplitude of NMC is seen to be much smaller than the normalized amplitude for the other the other coatings, LCO, and LFP. Further, the largest amplitude is seen for LFP.

Figure 7:
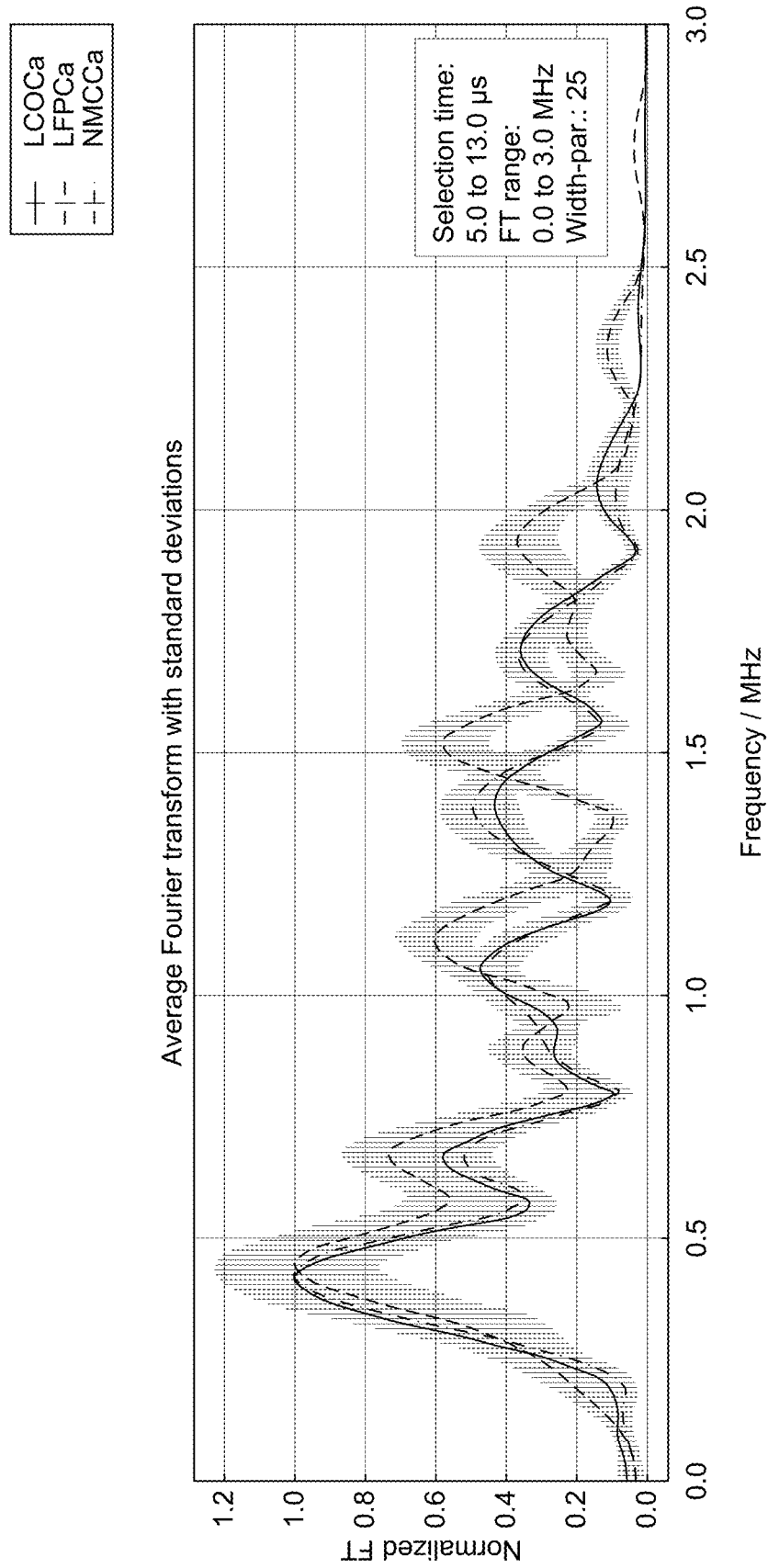
FIG. 7 illustrates Fourier transforms obtained from acoustic signal based analysis of cathode samples, according to aspects of this disclosure.

FIG. 7 shows the corresponding Fourier transforms for the pristine LCO, LFP, and NMC cathodes whose waveforms are shown in FIG. 6. In FIG. 7, it is seen that LFP and LCO match very closely in frequencies, while NMC shows a shift to higher frequencies for frequencies above 1 MHz.

Figure 8:
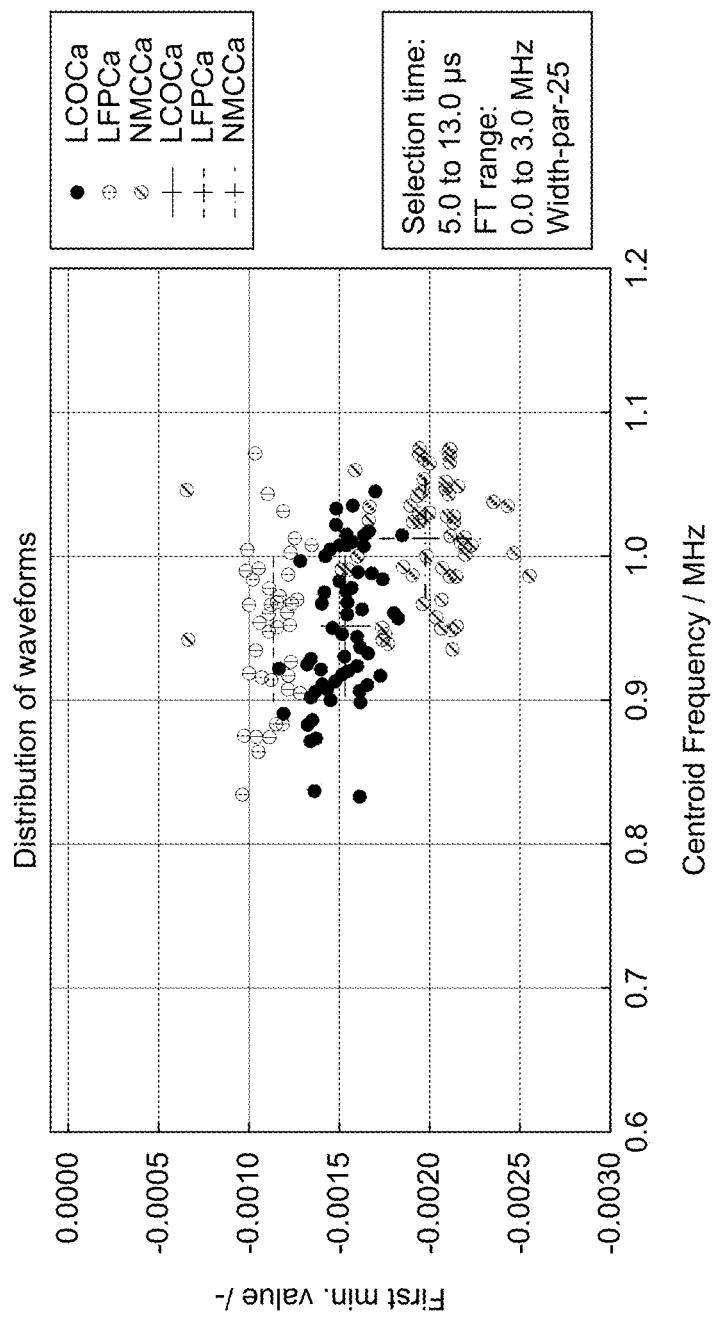
FIG. 8 illustrates first trough values and centroid frequencies obtained from acoustic signal based analysis of cathode samples, according to aspects of this disclosure.

FIG. 8 illustrates the first trough value's amplitude plotted as against centroid frequencies for pristine LCO, LFP, and NMC cathodes. A shift to higher frequencies is seen to correspond to a higher centroid frequency as seen from the distribution of waveforms. However, classification of the data based on centroid frequency alone may not be sufficient because of overlapping datasets for the different materials.

From FIG. 6, it is observed that the time-of-flight (ToF) for the cathodes shown therein are around an average value of ~6.9 µs which is 1.9 µs more than the corresponding ToF for pristine Aluminum samples. This difference corresponds to a wave velocity of ~1900 m/s. Aluminum foil is the current collector material used for the test results shown in FIG. 6 where the cathode materials LCO, LFP, and NMC are coated on the Aluminum foil. While the soundwaves introduced on the aluminum side may be assumed to propagate through the aluminum foil only and may not be affected by the presence of a coating, the increased ToF observed for the cathodes (cathode materials LCO, LFP, and NMC coated on Aluminum foil) indicates that there may be some interaction between the Aluminum and coating, leading to the time-of-flight difference.

Damaged Vs. Pristine Cathodes

In the following examples, waveforms and Fourier transforms for damaged cathodes are compared with those of pristine cathodes used as reference data, to determine distinctions between the damaged cathodes and pristine electrodes. The damaged and pristine cathodes are formed by coupling or coating materials such as NMC, LFP, and LCO on an Aluminum foil acting as a current collector (e.g., by coupling the cathode materials on the Aluminum current collector side only).

Figure 9:
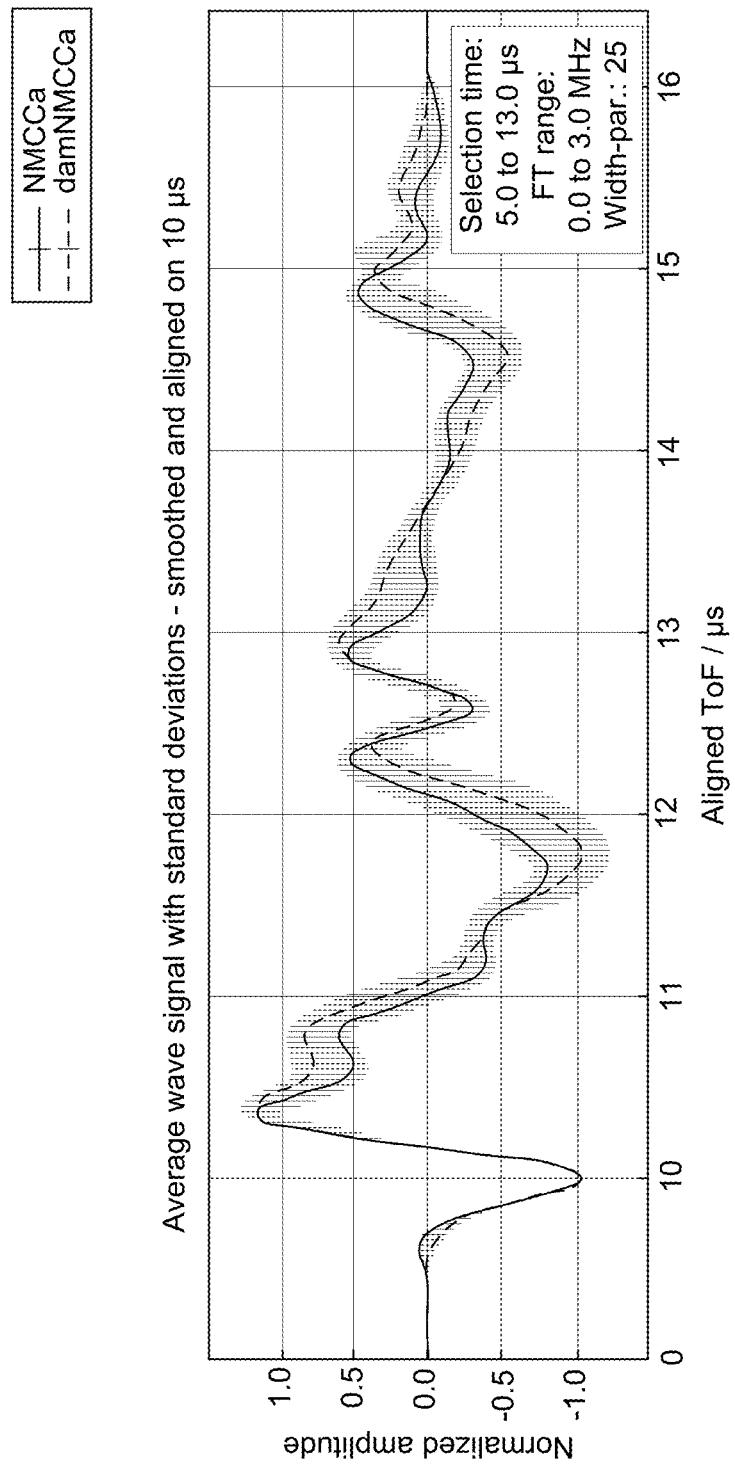
FIG. 9 illustrates average waveforms for damaged and pristine cathodes, obtained from acoustic signal based analysis of cathode samples, according to aspects of this disclosure.

FIG. 9 illustrates average waveforms for damaged and pristine NMC cathodes. Although wide error bars are seen, the waveforms illustrate some differences between the damaged and pristine NMC cathodes. The error bars are seen to be wide, which may restrict accurate conclusions based on these differences.

Figure 10:
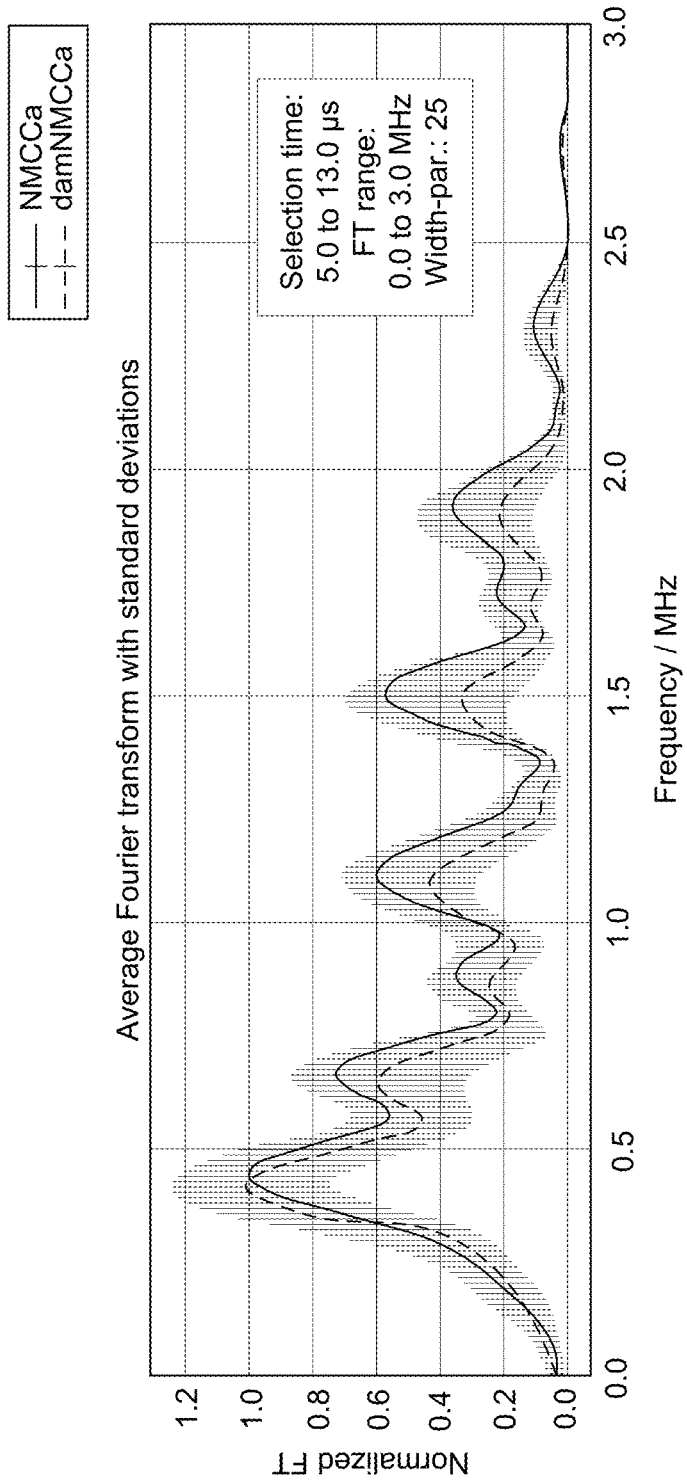
FIG. 10 illustrates averaged Fourier transforms for damaged and pristine cathodes, obtained from acoustic signal based analysis of cathode samples, according to aspects of this disclosure.

FIG. 10 illustrates averaged Fourier transforms for pristine and damaged NMC cathodes, where it is seen that for frequencies above 1 MHz, the damaged NMC samples display lower intensities, as well as a small shift to lower frequencies.

Figure 11:
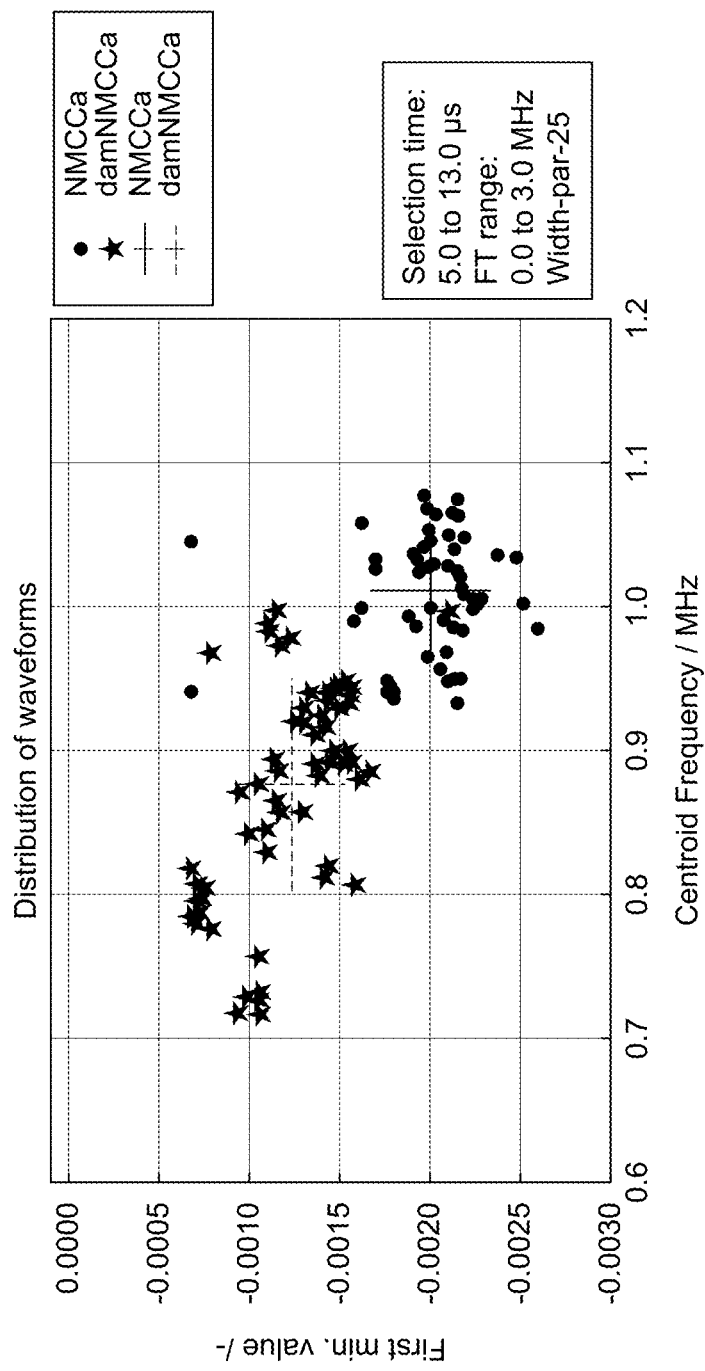
FIG. 11 illustrates centroid frequencies for damaged and pristine cathodes, obtained from acoustic signal based analysis of cathode samples, according to aspects of this disclosure.

FIG. 11 illustrates centroid frequency for pristine and damaged NMC cathode, where it is seen that damaged NMC cathodes display lower centroid frequencies in comparison to pristine cathodes. Although some data points are seen to overlap between the damaged and pristine NMC cathodes owing to possible misalignment in the experimental setup, it a trend in centroid frequency and first trough magnitude is observed where damaged electrodes show smaller centroid frequencies and smaller first trough magnitudes.

Figure 12:
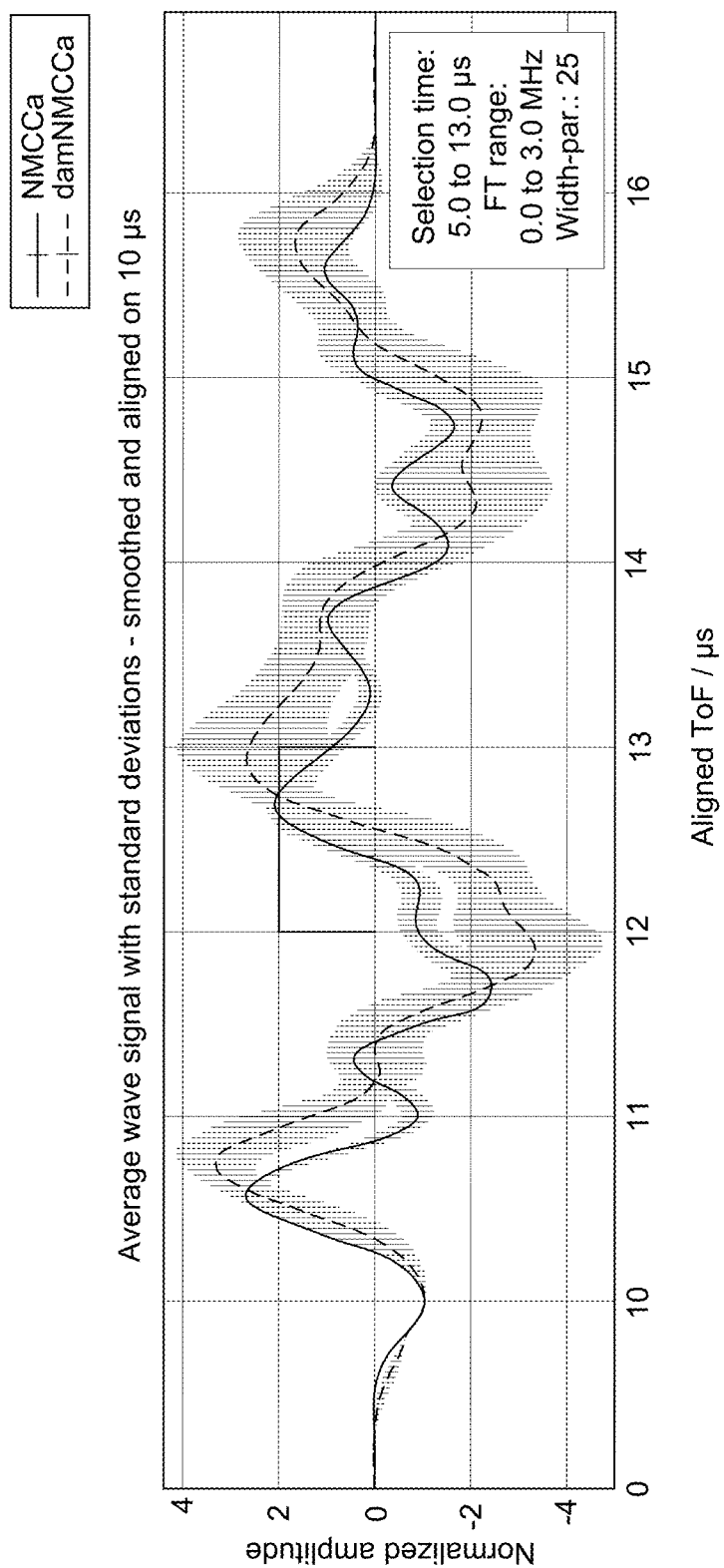
FIG. 12 illustrates average waveforms for damaged and pristine cathodes, obtained from acoustic signal based analysis of cathode samples, according to aspects of this disclosure.

FIG. 12 illustrates average waveforms for damaged and pristine LFP cathodes, where it is seen that damaged LFP cathodes display a shift in ToF and less prominent peaks.

Figure 13:
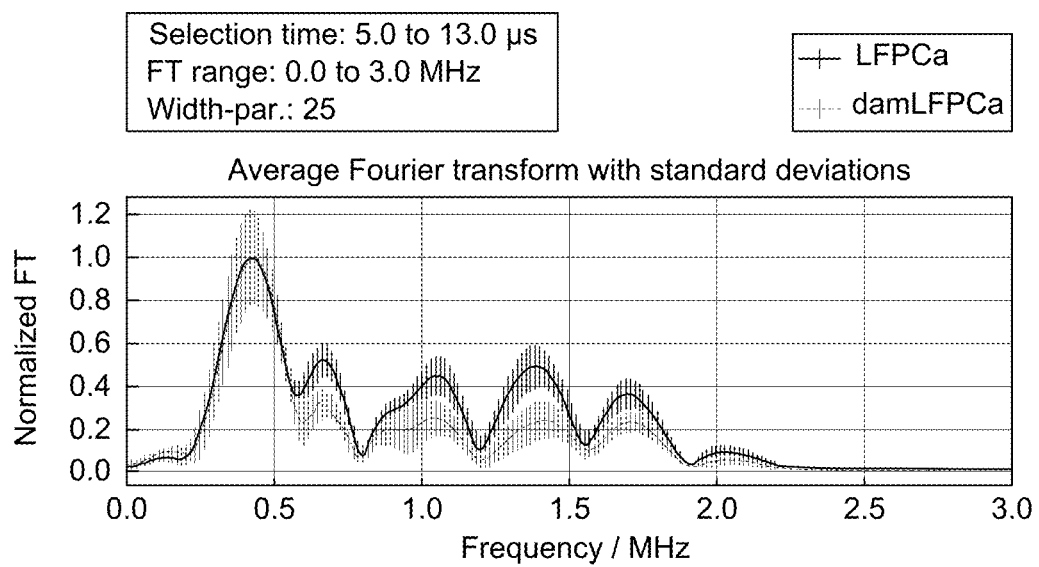
FIG. 13 illustrates averaged Fourier transforms for damaged and pristine cathodes, obtained from acoustic signal based analysis of cathode samples, according to aspects of this disclosure.

FIG. 13 illustrates averaged Fourier transforms for pristine and damaged LFP cathodes, where it is seen that the damaged LFP cathodes have weaker high frequency components than the pristine LFP cathodes, which also translates to smaller centroid frequencies, as seen below.

Figure 14:
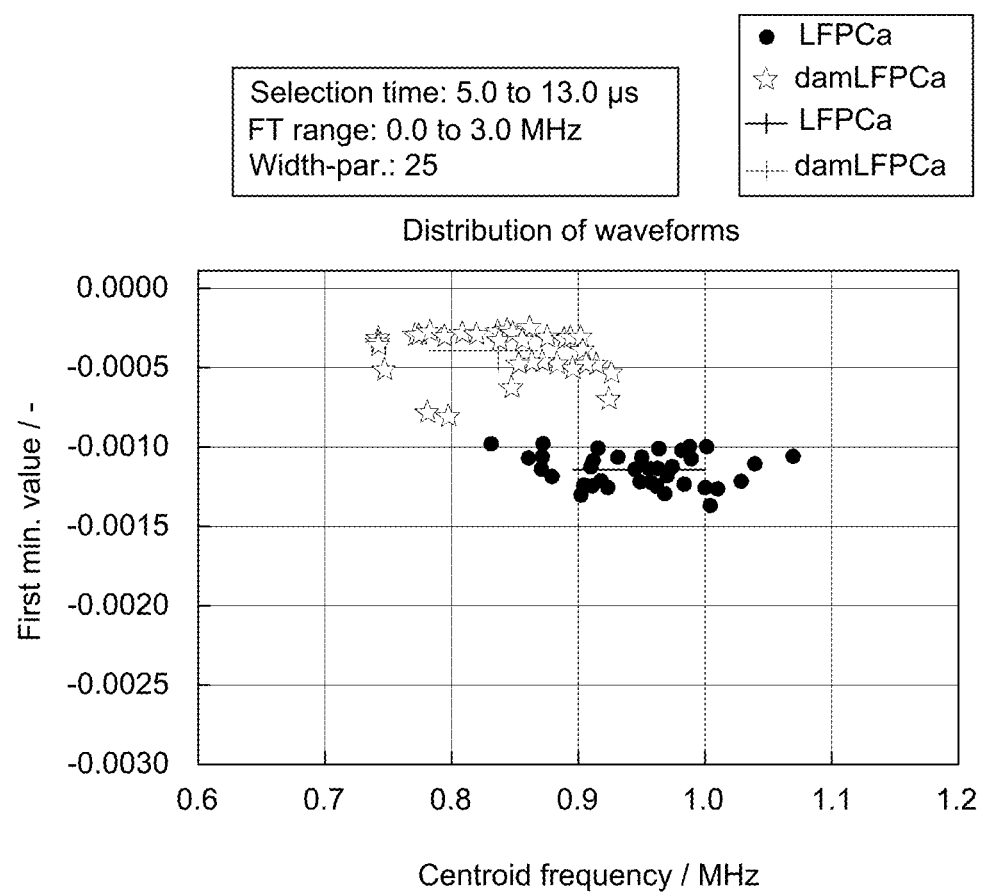
FIG. 14 illustrates centroid frequencies for damaged and pristine cathodes, obtained from acoustic signal based analysis of cathode samples, according to aspects of this disclosure.

FIG. 14 illustrates centroid frequency for pristine and damaged LFP cathodes, where the centroid frequencies and intensities for damaged LFP cathodes are seen to be generally smaller than the corresponding centroid frequencies and intensities for pristine LFP cathodes (although there is some overlap in centroid frequency distribution).

Figure 15:
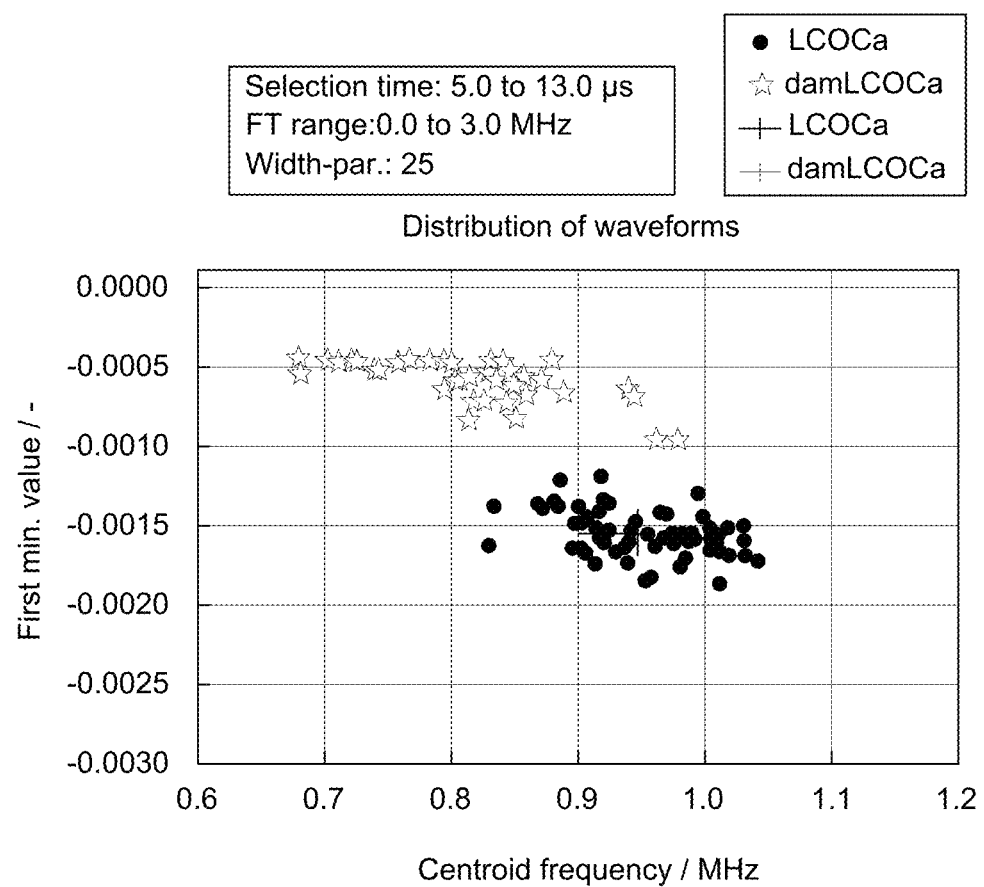
FIG. 15 illustrates average waveforms for damaged and pristine cathodes, obtained from acoustic signal based analysis of cathode samples, according to aspects of this disclosure.

FIG. 15 illustrates average waveforms for damaged and pristine LCO cathodes, where damaged LCO cathodes are observed to display a smaller centroid frequency and amplitude than the pristine LCO cathodes.

As observed from FIGS. 9-15, the datasets for damaged and pristine cathodes show consistently that damaged electrodes have smaller centroid frequencies than pristine electrodes and smaller first through magnitudes. This difference in centroid frequencies may be attributed to the lower intensities for frequencies above 0.6 MHz, since higher frequency waves attenuate faster. The soundwaves at higher frequencies may also be scattered by the defects in the damaged electrode samples, causing the overall intensity to decrease. This shift in centroid frequencies corresponds to a decrease in first trough magnitude, which serves as the metric for intensity. Thus, damaged electrodes (e.g., cathodes) can be distinguished from pristine electrodes (cathodes) based on metrics such as the centroid frequency and first trough magnitude, as discussed above.

Coupling on LFP Coating

The following sections are directed to determining differences in signals for coupling on the coating side instead of the current collector side (noting that in FIGS. 9-15 the cathode materials were coupled to the Aluminum current collector side only).

Figure 16A:
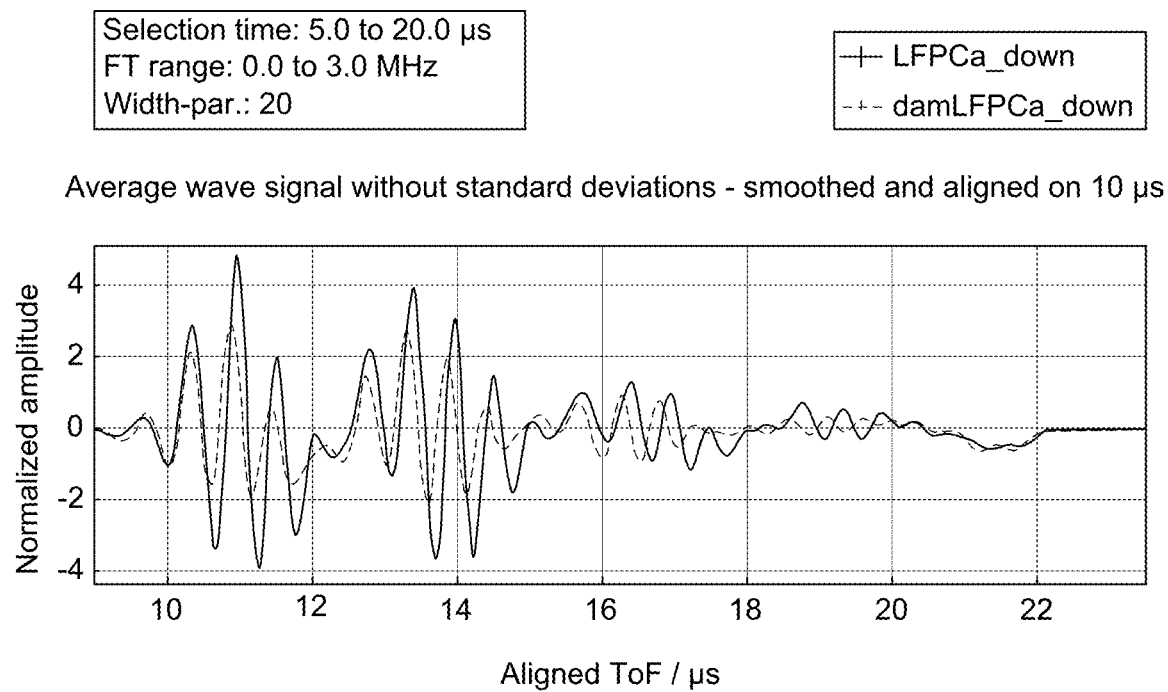
FIGS. 16A-B illustrate waveforms for cathodes, obtained from acoustic signal based analysis of cathode samples, according to aspects of this disclosure.
Figure 16B:
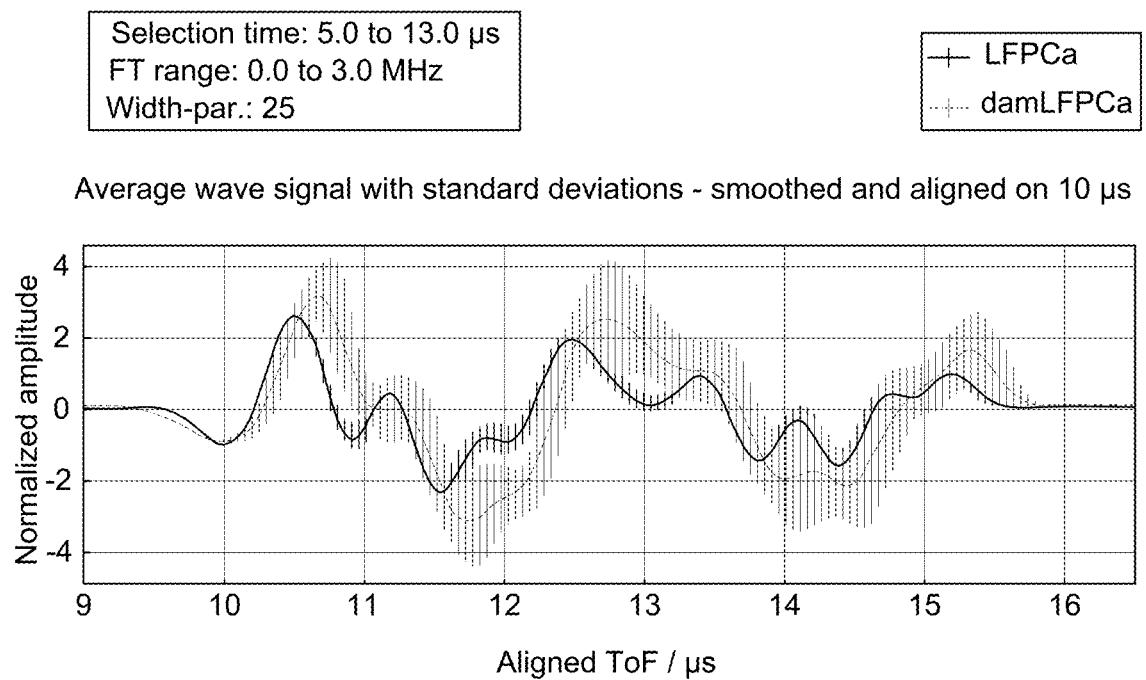

FIG. 16A shows the waveforms for LFP coupled on the coating and FIG. 16B shows the waveforms for LFP coupled on the current collector. It is seen from FIGS. 16A-B that even though the ToF window for coupling on the coating is increased, the peaks are much more prominent for a given ToF window. Analyzing the Fourier transforms reveals that for in pristine electrodes, for frequencies above 1.1 MHz stronger intensities are observed, which become the dominant frequencies. Damaged electrodes however show a stronger low frequency component around 0.4 MHz.

Figure 17:
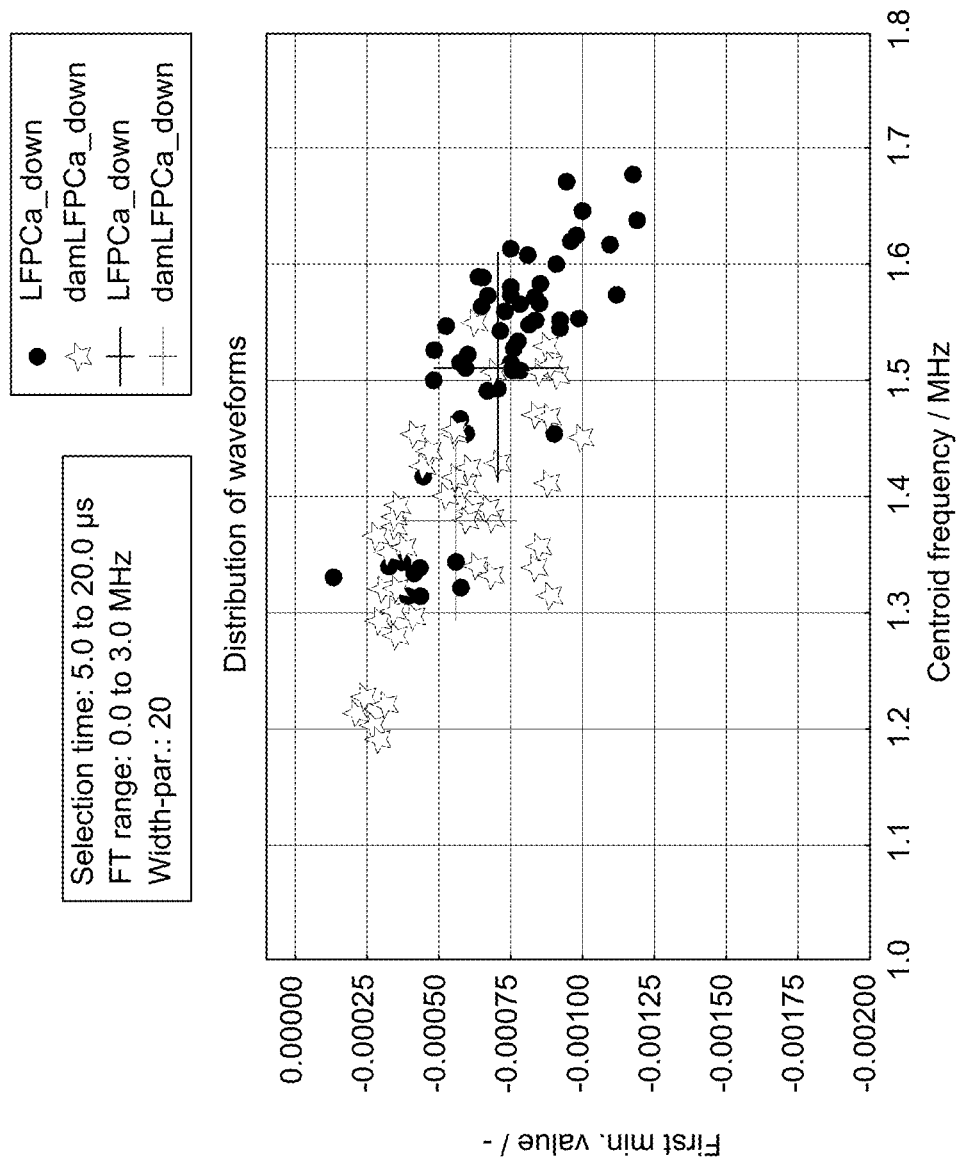
FIG. 17 illustrates centroid frequencies for cathodes, obtained from acoustic signal based analysis of cathode samples, according to aspects of this disclosure

FIG. 17 illustrates the centroid frequency distribution, where the damaged samples show an average smaller centroid frequency, despite significant overlap in the datasets for the damaged and pristine samples.

Double-Side Coated NMC Cathodes

For commercial batteries, electrodes are coated on both sides because this allows to reduce current collector material. Furthermore, the double-sided coatings can lead to lower costs and non-active mass contents. However, double-sided coating is more challenging because it places a higher demand on proper alignment of electrode strips. Scrapping double-side coated electrodes results in a higher loss of active material and process costs. The following sections provide techniques for determining defects in double-sided coatings using acoustic signal analysis. Damaged and pristine double-side coated NMC electrodes are considered in the following sections.

Figure 18:
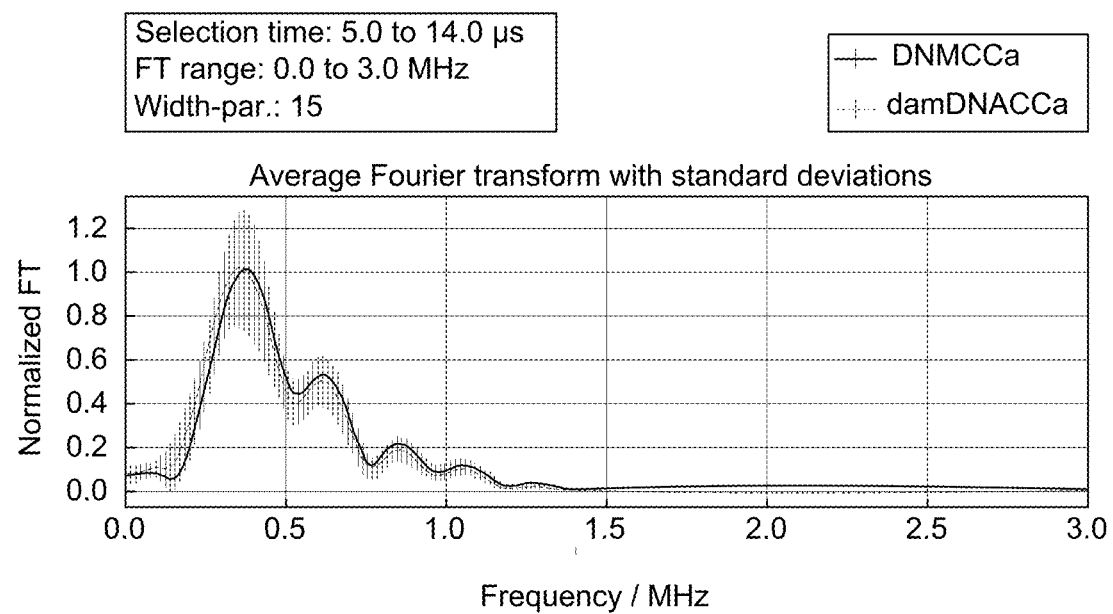
FIG. 18 illustrates waveforms for double-side coated cathodes, obtained from acoustic signal based analysis of cathode samples, according to aspects of this disclosure.

FIG. 18 shows the Fourier transform for double-side coated NMC in damaged and pristine form, where no component for frequencies above 1.25 MHz is observed.

Figure 19:
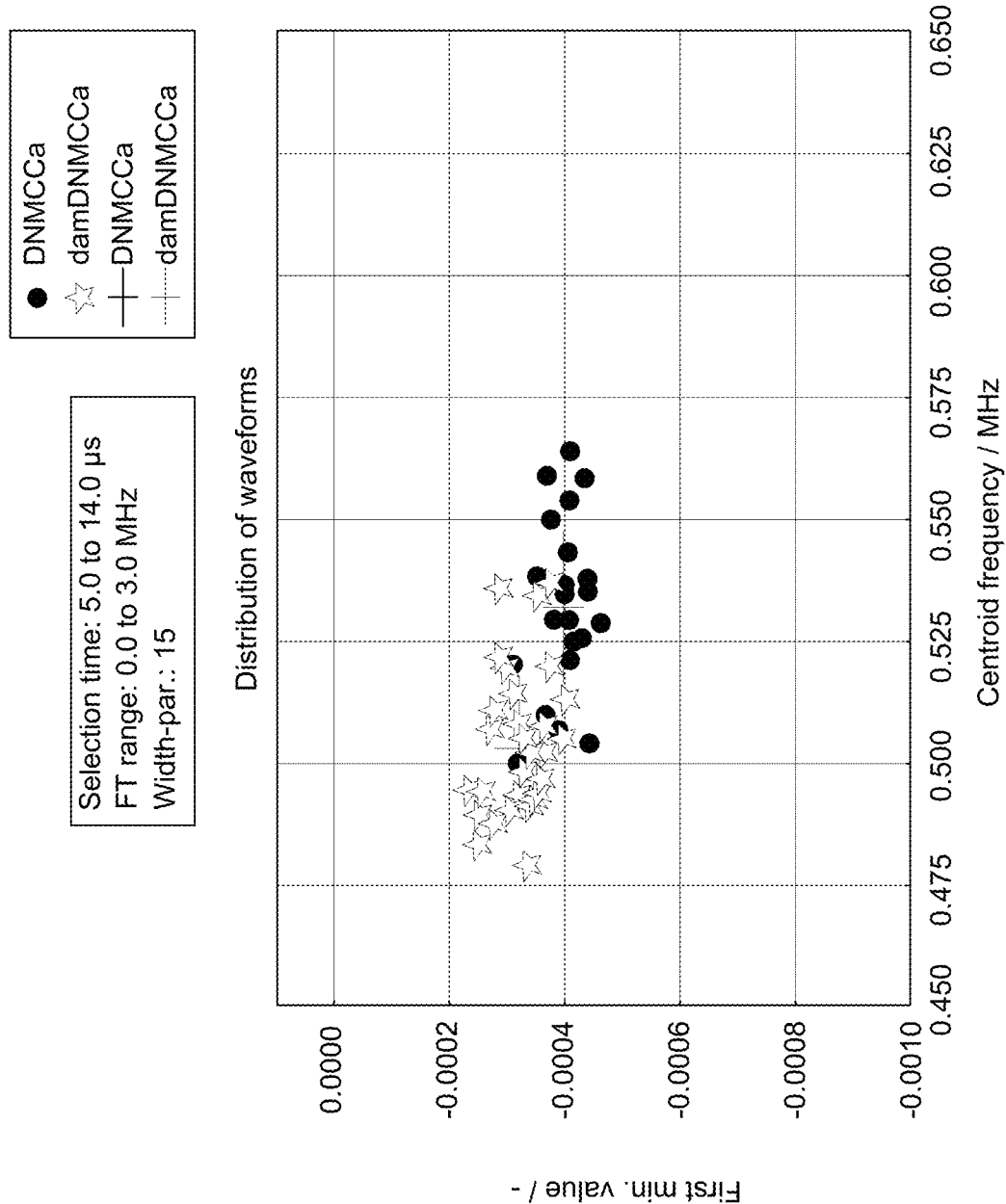
FIG. 19 illustrates centroid frequencies for double-side coated cathodes, obtained from acoustic signal based analysis of cathode samples, according to aspects of this disclosure

FIG. 19 illustrates centroid frequencies for double-side coated NMC in damaged and pristine form. While the Fourier transforms are seen to be closely overlapping in FIG. 18, the intensity and first trough magnitude also display overlap in FIG. 19. Such overlap may be due to poor signal quality of NMC coupled directly on the coating, as the NMC coating may release significant amounts of particles thus contaminating the couplant's surface. However, for other active materials, less overlap and higher levels of detectability based on centroid frequency, intensity, and first trough magnitude is possible.

Damaged Vs. Pristine Anodes

The following sections are directed to determining differences in waveforms and Fourier transforms for damaged and pristine anode coatings.

Figure 20:
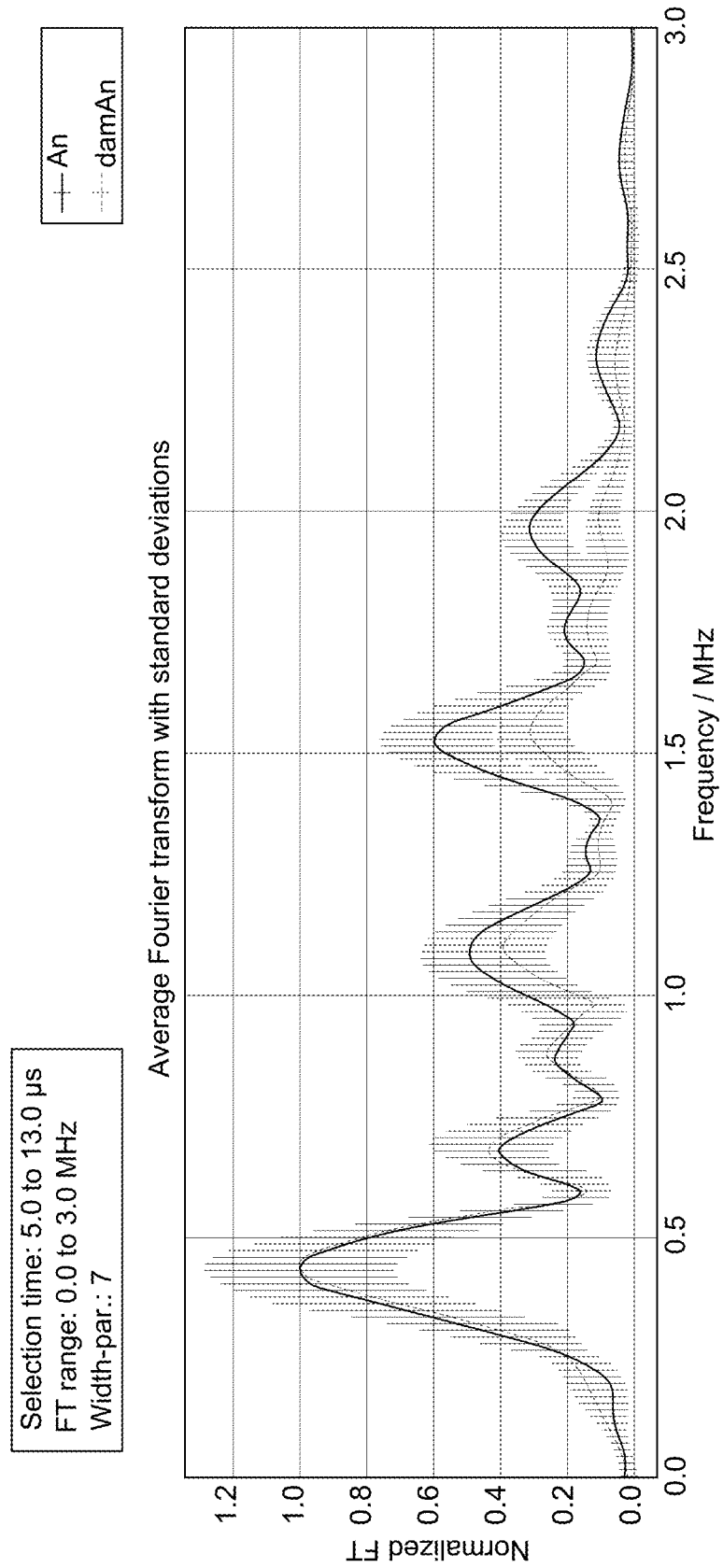
FIG. 20 illustrates Fourier transforms for damaged and pristine anodes, obtained from acoustic signal based analysis of cathode samples, according to aspects of this disclosure.

FIG. 20 illustrates Fourier transforms for damaged and pristine graphite anodes. Damaged anodes are observed to display lower intensities (e.g., for frequencies above 0.80 MHz)

Figure 21:
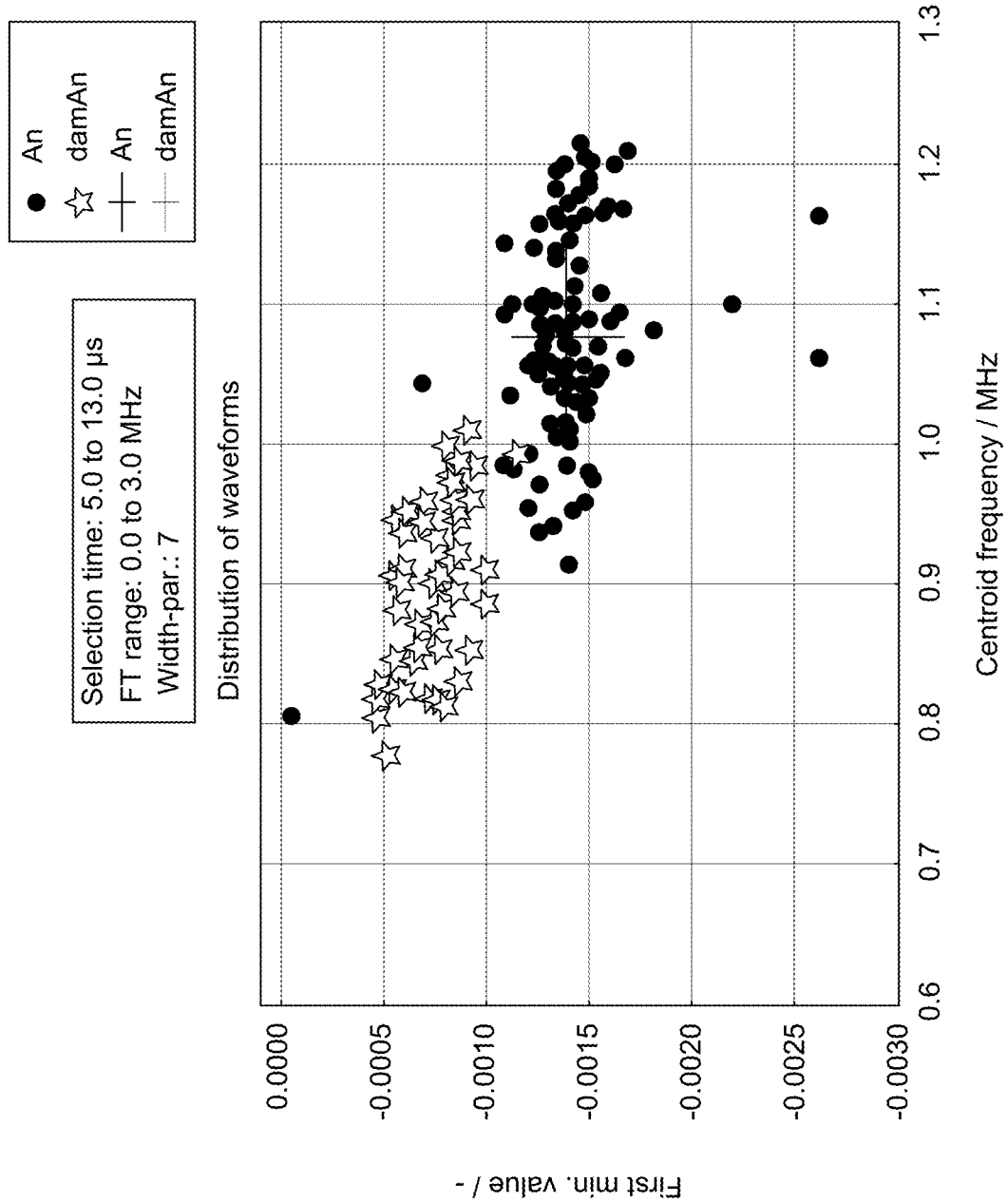
FIG. 21 illustrates centroid frequencies for damaged and pristine anodes, obtained from acoustic signal based analysis of cathode samples, according to aspects of this disclosure.

FIG. 21 illustrates the distribution of waveforms for damaged and pristine graphite anodes. The damaged anodes are seen to display lower centroid frequencies (although an overlap in centroid frequency is seen for damaged and pristine anodes). The first trough magnitude shows a more distinct divide between damaged and pristine samples even though some data points overlap.

The actual ToF for anodes was observed to be 6.7 μs, corresponding to 1940 m/s (for comparison, the P-wave velocity of copper is $c\_P=4900$ m/s and the S-wave velocity equals $c\_S=2300$ m/s). Thus, the calculated velocity is in the range of S-waves for the anodes, which is the same observed for Aluminum electrodes.

Sweeps and Spatial Analysis of LFP Coatings

In the following sections, LFP and LCO sweeps are described, for mimicking the setup for a damaged electrode strip moving along the transducer-transducer axis, similar to a manufacturing environment. In such a setup, the signal changes can be observed based on position of the electrode, to determine whether a desired trend of shift to lower centroids and smaller first trough magnitudes is observable.

The following analysis is described for centroid frequency and first trough magnitude selected as the metrics (rather than Fourier transform and waveforms) as the data sets obtained using these selected metrics are observed to display intended trends for differences between damaged and pristine samples. The results are presented according to the following scheme: same color group represents the same position type:
 1. Blue: outside of the measurement environment,
 2. Green: on the transducer,
 3. Orange/red: adjacent to the transducer
 4. Black: in the center position which is the position used in previous measurements.

Figure 22:
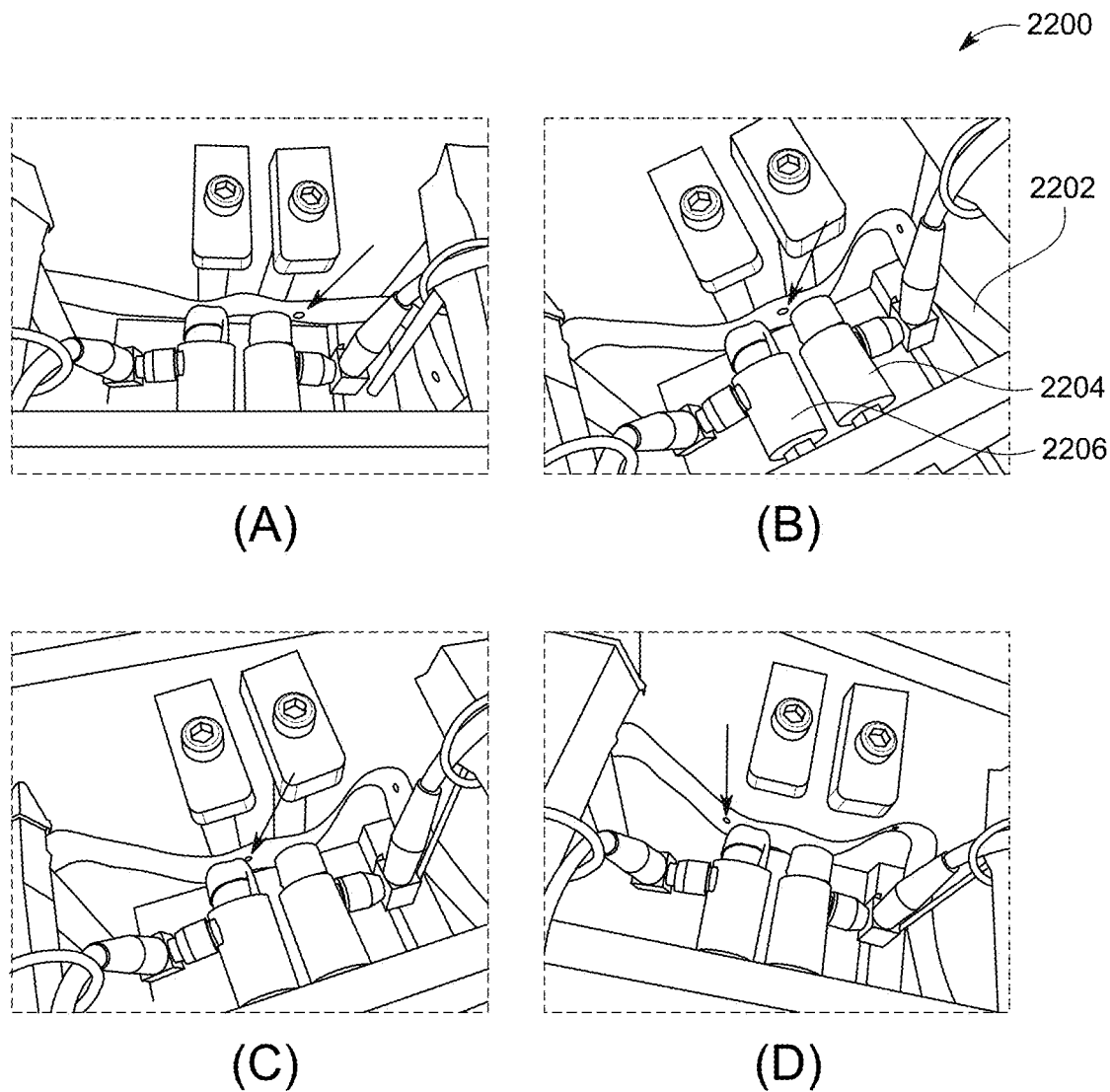
FIG. 22 illustrates a system for sweeping an electrode strip for acoustic signal based analysis according to aspects of this disclosure.

FIG. 22 illustrates a system 2200 for sweeping an electrode strip 2202 across a pulser 2204 and a receiver 2206 (e.g., Tx and Rx transducers, respectively). The electrode strip 2202 is shown in four positions A, B, C, D corresponding to a sweep. A defect in the electrode (identified using an arrow in FIG. 22) moves from the position A (right of the pulser 2204, outside of the measurement rage) to positions B and C (left and right of the receiver 2206, both within the measurement range) to position D (left of the receiver 2206, again outside of the measurement range), as the electrode strip 2202 is moved or swept across the pulser 2204 and the receiver 2206.

Figure 23:
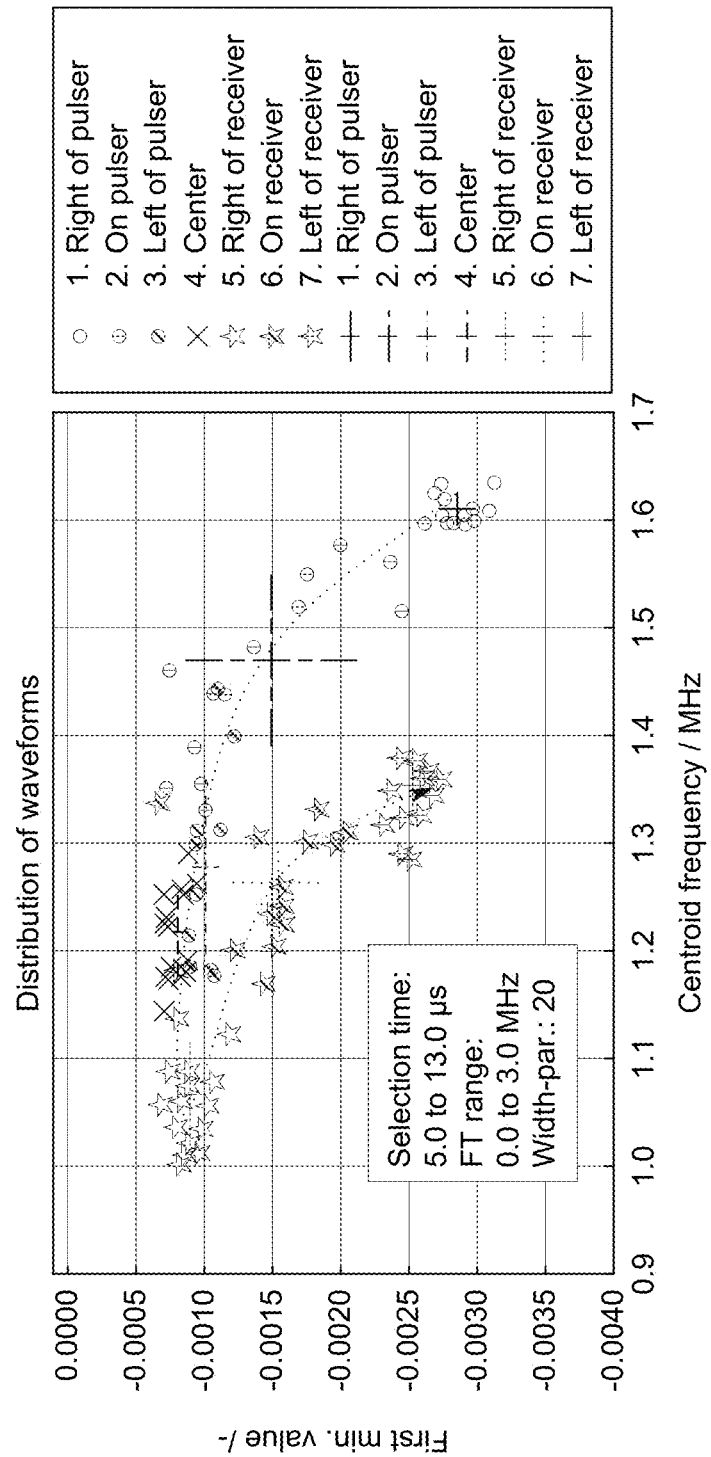
FIG. 23 illustrates first trough magnitude and centroid frequency based on sweeping an electrode strip for acoustic signal based analysis, according to aspects of this disclosure.

FIG. 23 illustrates the first trough magnitude and centroid frequency based on sweeping a damaged LFP cathode used as the electrode strip 2202 across the transducer-transducer axis, e.g., using the system described in FIG. 22. A trend highlighted with a dotted purple line serves as a guide for appearance of a defect in the LFP cathode. The centroid frequency is seen to decrease when the defect appears in the measurement range and increases again upon leaving the measurement range. The first trough magnitude shows the same trend of decreasing when the defect appears in the measurement range and increasing again upon leaving the measurement range. However, differences are observed between the initial point (e.g., position A, right of the pulser 2204) and end point (e.g., position D, left of the receiver 2206) for centroid frequency while the intensity is the same for the initial and end points.

Figure 24:
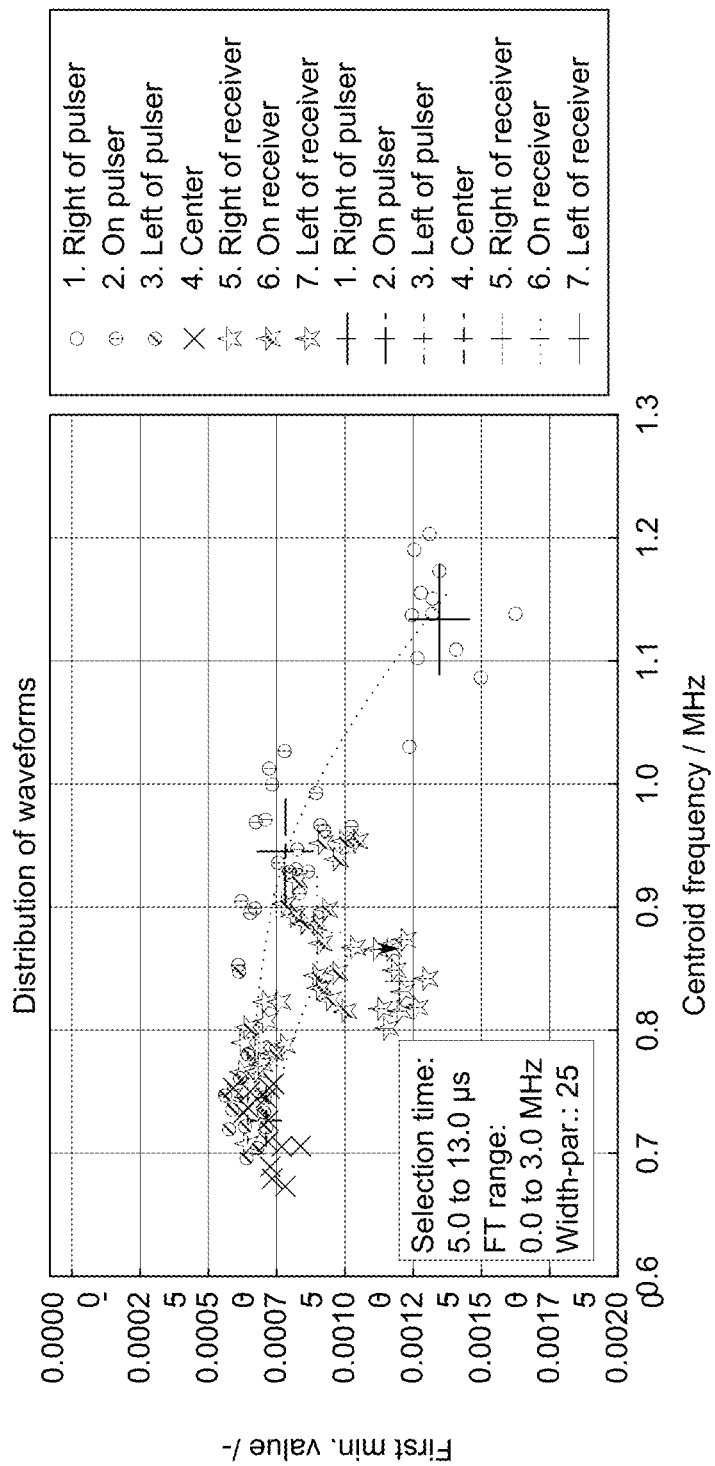
FIG. 24 illustrates first trough magnitude and centroid frequency based on sweeping an electrode strip for acoustic signal based analysis, according to aspects of this disclosure.

FIG. 24 illustrates the first trough magnitude and centroid frequency based on sweeping a damaged LCO cathode used as the electrode strip 2202 across the transducer-transducer axis, e.g., using the system described in FIG. 22. The trends observed are similar to those for the LFP discussed with reference to FIG. 23: a shift to lower centroid frequencies is observable; start and end point do not match in terms of centroid frequency but display a closer match in terms of intensity. Data points for values to the right of the pulser were filtered to remove some data points with lower centroid frequencies from being illustrated, for the sake of clarity.

The mismatch in start and endpoints in FIGS. 23-24 can occur due to potential degradation of the sample in the course of sweeping the sample using the system shown in FIG. 22 for measurement. Such degradation can occur due to compression of coating, because contamination of the couplant's surface was not observed during execution. Improvements to this may lead to the potential degradation being mitigated and a higher level of matches between the start and end points.

Spatial Analysis of LFP Coatings

The following sections are directed to detecting differences for the same material strip along different positions during a sweep.

Figure 25:
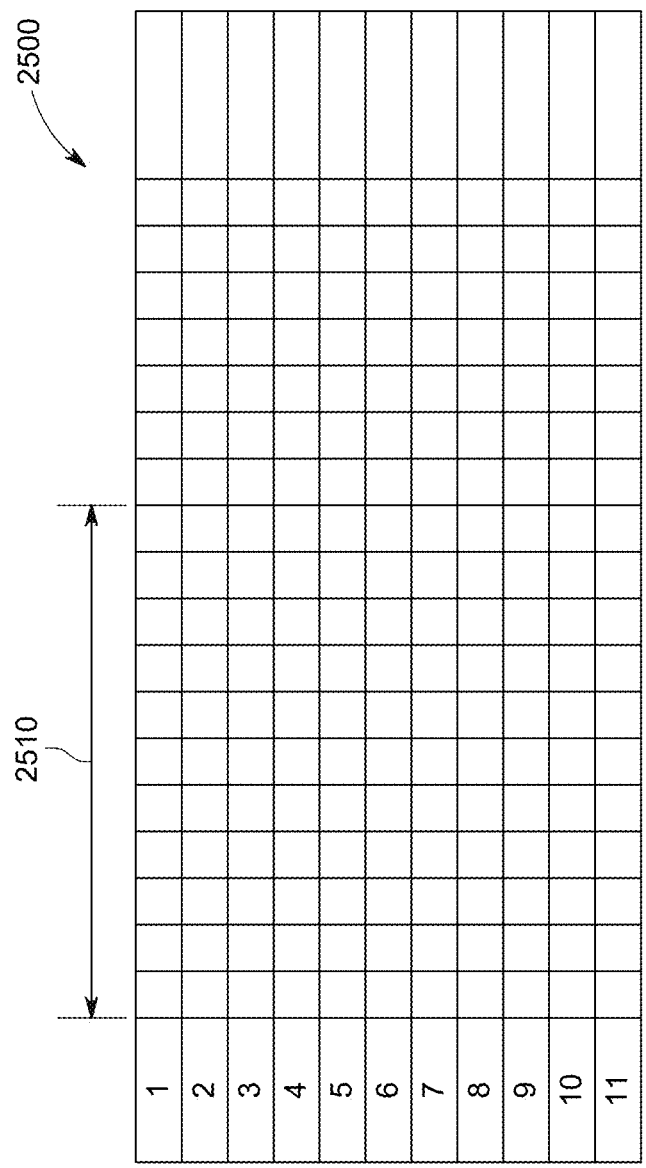
FIG. 25 illustrates a system for performing spatial analysis of an electrode strip, according to aspects of this disclosure.

FIG. 25 illustrates an example system 2500 for performing spatial analysis of an electrode strip (e.g., LFP electrode strip). The LFP electrode strip is divided into different cells, and with multiple (e.g., 10) data points collected per cell (indicated by arrow 2510), when, for example, the cell was aligned on the receiver 2206 using the system 2200 shown in FIG. 22, for example.

Figure 26:
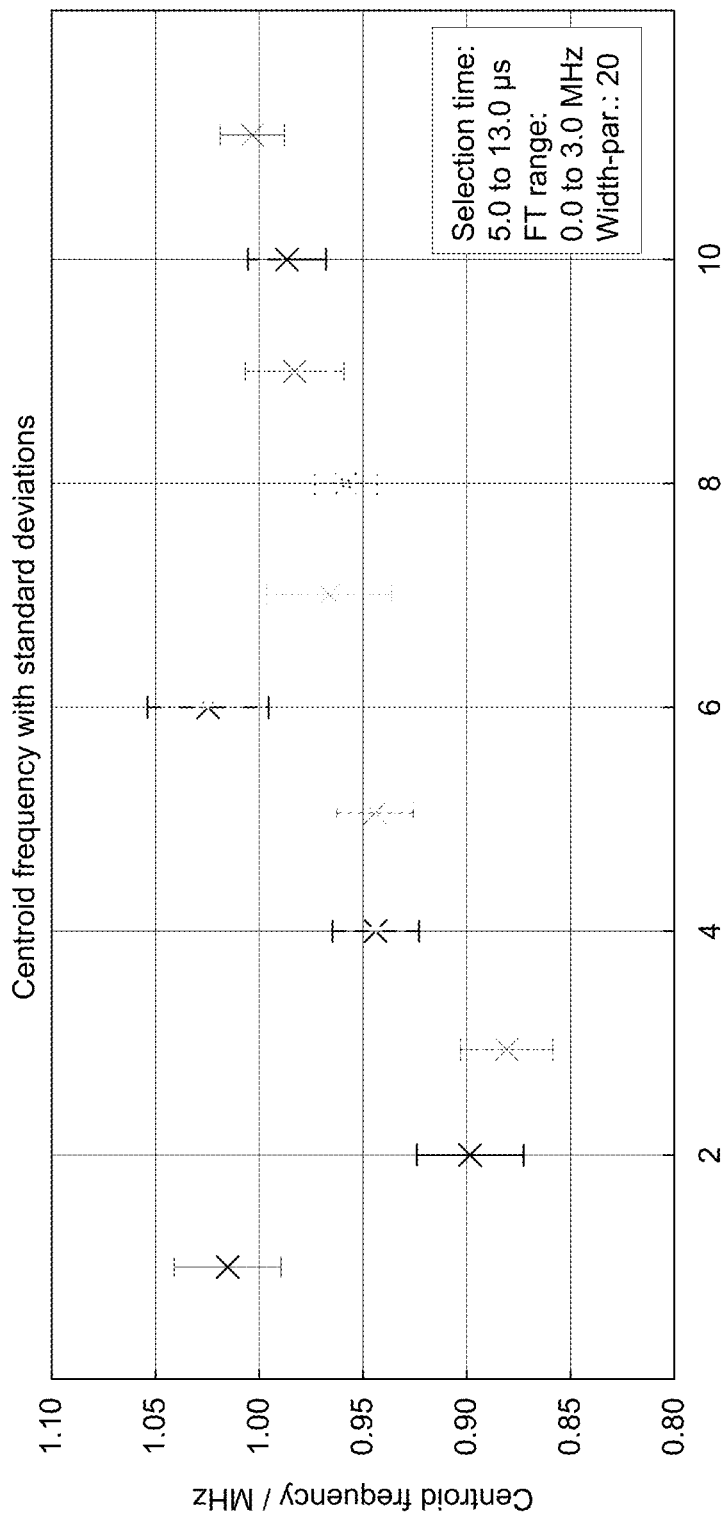
FIG. 26 illustrates the centroid frequencies obtained from spatial analysis of an electrode strip, according to aspects of this disclosure.

FIG. 26 illustrates the centroid frequencies for the spatial analysis 2500. A difference for centroid frequencies collected along the electrode strip is observed in the centroid frequencies, even though error bars are seen to overlap for different locations. Improvements to the system for the spatial analysis 2500 can yield a reduction in the spread for data collected at each location or cell.

Figure 27:
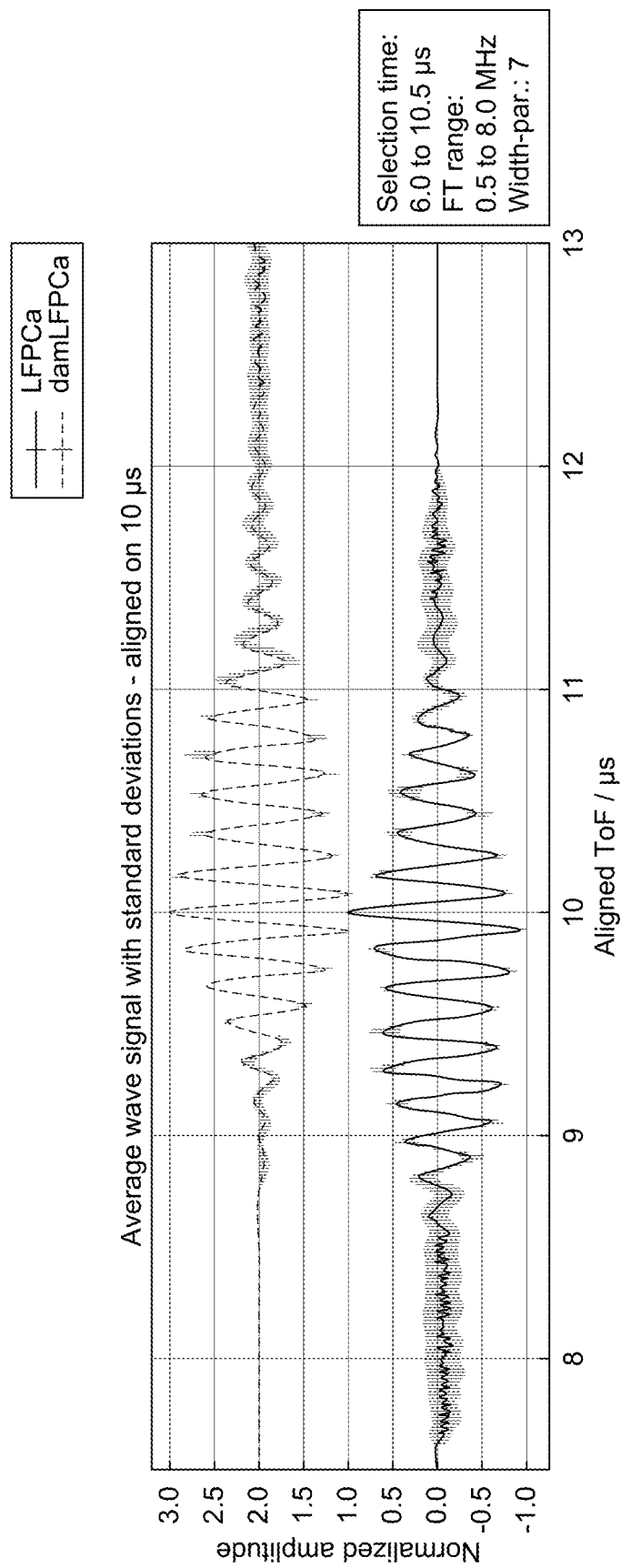
FIG. 27 illustrates the centroid frequencies obtained from spatial analysis of an electrode strip using a system according to aspects of this disclosure.

FIG. 27 illustrates the waveforms obtained based on improvements to the system. Using high frequency transducers (e.g., 10 MHz transducers) for the pulser and receivers, LFP cathodes of higher quality were used in the spatial analysis for the potential improvements to the system. Data obtained from the higher frequency transducers is better served using data processing designed for higher resolution. The following improvements were provided to the data analysis: smoothing functions were removed; alignment performed by alignment to the strongest peak; normalization performed by dividing with the strongest peak's intensity; and by coupling on the current collector side, some waves were removed to receive more representative waveforms.

Furthermore, the presentation of the waveforms in FIG. 27 improves the display of distinctions between damaged and pristine LFP electrodes. Due to high frequencies of the transducers (e.g., 10 MHz), alignment becomes can be affected by small changes in ToF, which can cause relatively larger time shifts, potentially making the first trough detection more difficult.

As seen in FIG. 27, the filtered waveforms for LFP electrodes coupled on the current collector side reveals a distinctive difference in shape. Waveforms for damaged LFP electrodes are observed to have a shorter ToF in comparison to waveforms for pristine electrodes. The respective ToFs are ~6.7 and ~5.9 μs for pristine and damaged electrodes. A time window (e.g., a time range from 6 to 10.5 μs) is shown, while some detected waves may be outside this time window.

The following observations are possible using the above data. For 2.25 MHz measurements:
1. A damaged electrode shows smaller first trough magnitudes than a pristine electrode;
2. A damaged electrode shows smaller centroid frequencies than a pristine electrode;
3. Signal quality when coupling on the coating side may be dependent on the coating material.

For 10 MHz measurements, it was observed that:
1. Waveform quality is dependent on the coating material;
2. Signal amplitude increases when the electrode is damaged;
3. ToF decreases for damaged electrodes;
4. Centroid frequency increases for damaged electrodes.

Guided Waves

In some example systems for acoustic signal based analysis of electrodes, guided waves can be used, as guided waves can yield improved data points for the above analyses. Guided waves, as referred to herein, are acoustic waves which can be guided or directed at specific points or angles to be incident at a particular location or with predetermined characteristics. For example, a wedge or other device can be used to create a waveguide for angling the acoustic waves into the coating or thin-film sample. However, introduction of guided waves into a system for manufacturing or testing thin-film samples is challenging. This is because performing acoustic signal sweeping of thin-films or foils using guided waves (e.g., as shown in FIG. 22) can require the use of customized mechanisms to provide proper tension and proper alignment. While commercially available wedges can be designed to apply pressure on a probe (e.g., a pulser) which has intrinsic solidity for providing tension, the following techniques provide improved alternatives which can support the use of guided waves in existing setups.

Figure 28:
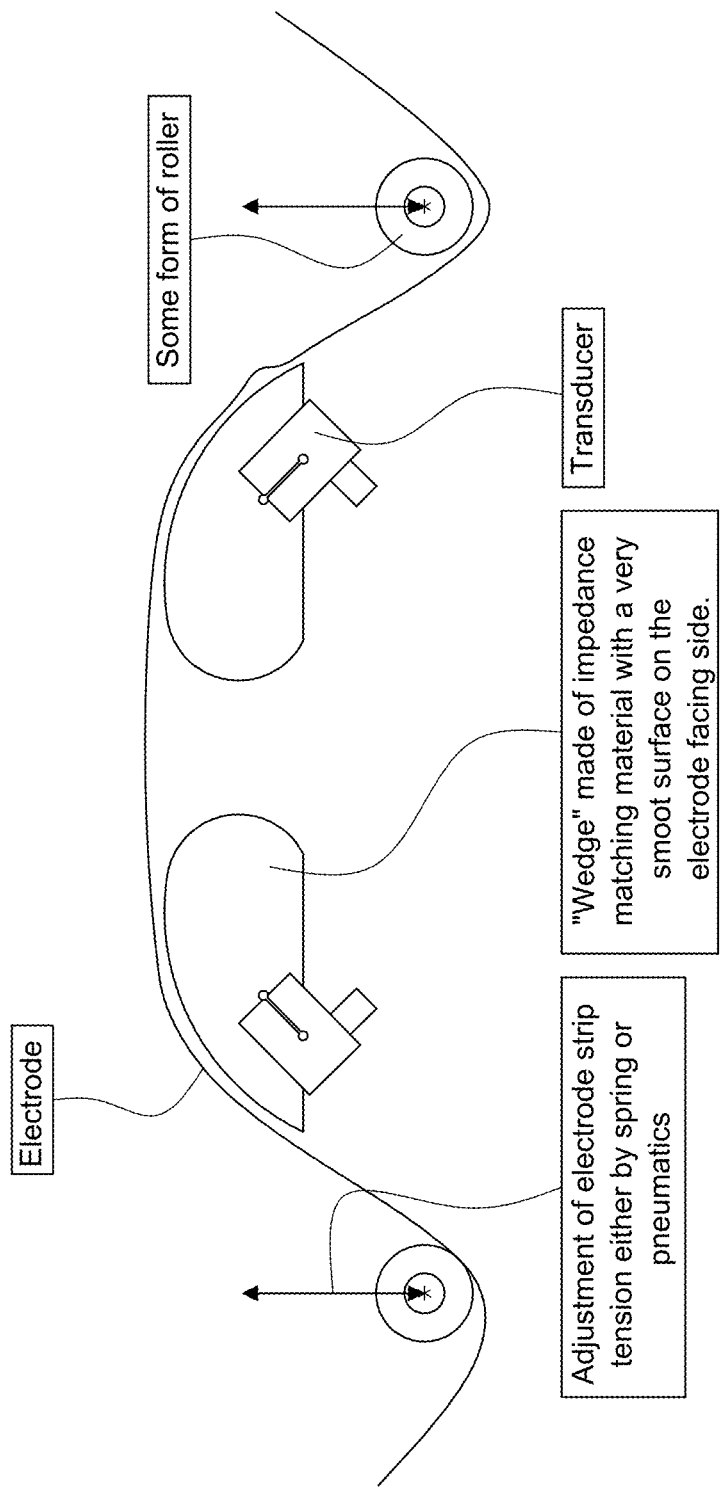
FIG. 28 illustrates a system for use in acoustic signal analysis of an electrode strip using guided waves, according to aspects of this disclosure.

FIG. 28 illustrates an example system 2800 for use in acoustic signal analysis of strips, thin-films, or foils using guided waves as the acoustic input signals. An electrode strip 2802 is shown, which can be passed through rollers 2806 or other mechanisms for sweeping or moving the electrode strip 2802 (e.g., automated movement without human interaction) for measurement at various positions on the body of the electrode strip 2802. Wedges 2810 are shown, which can be constructed from material which is impedance matched with either the electrode coating or current collector of the electrode strip 2802. Transducers 2804 may be provided within the wedges 2810 to provide guided acoustic waves. The transducers 2804 may not directly contact the electrode strip 2806 but may be located at a distance suitable for providing the guided waves. Tension 2807 can be provided by mechanisms which press the electrode strip 2802 against the wedges 2810. For example, mechanisms 2808 can include springs or pneumatic systems for providing the tension. A gel can optionally be used between wedges 2810 and the electrode strip 2802. Fast movement of a long electrode strip 2802 across the wedges 2810 can cause frictional heat. The surfaces of the wedges 2810 (especially those which can come in contact with the electrode strip 2802) can be made very smooth to allow the electrode strip 2802 to slide or glide smoothly over the wedges 2810.

Some alternatives to wedges can include rollers as previously described, or combinations of rollers and wedges. For example, an outline 2820 is shown in dashed lines to provide a schematic of a roller design within which wedges can be accommodated. Although outline 2820 is illustrative of a possible implementation, a more circular shape of the outline 2820 may be implemented in practical setups for cylindrical rollers. The roller can be one of the rollers shown in FIGS. 2A-2D in which transducers can be embedded. The outline 2820 conveys that the same material used in a wedge can be designed in the shape of a cylindrical roller with a circular cross-section (corresponding to the outline 2820), which can allow easier and smoother movement of the electrode strip 2802.

"Roller transducers" can refer to rollers in which the transducers 2804 can be provided and used to provide guided acoustic waves to excite the electrode strip 2802. The roller transducers can be implemented with relative ease in a manufacturing environment. The roller transducers can be designed using rollers used for pipe corrosion detection and thus may be in existing setups and products. The roller transducers can be used as an alternative to wedges or in addition to wedges in some setups.

Figure 29:
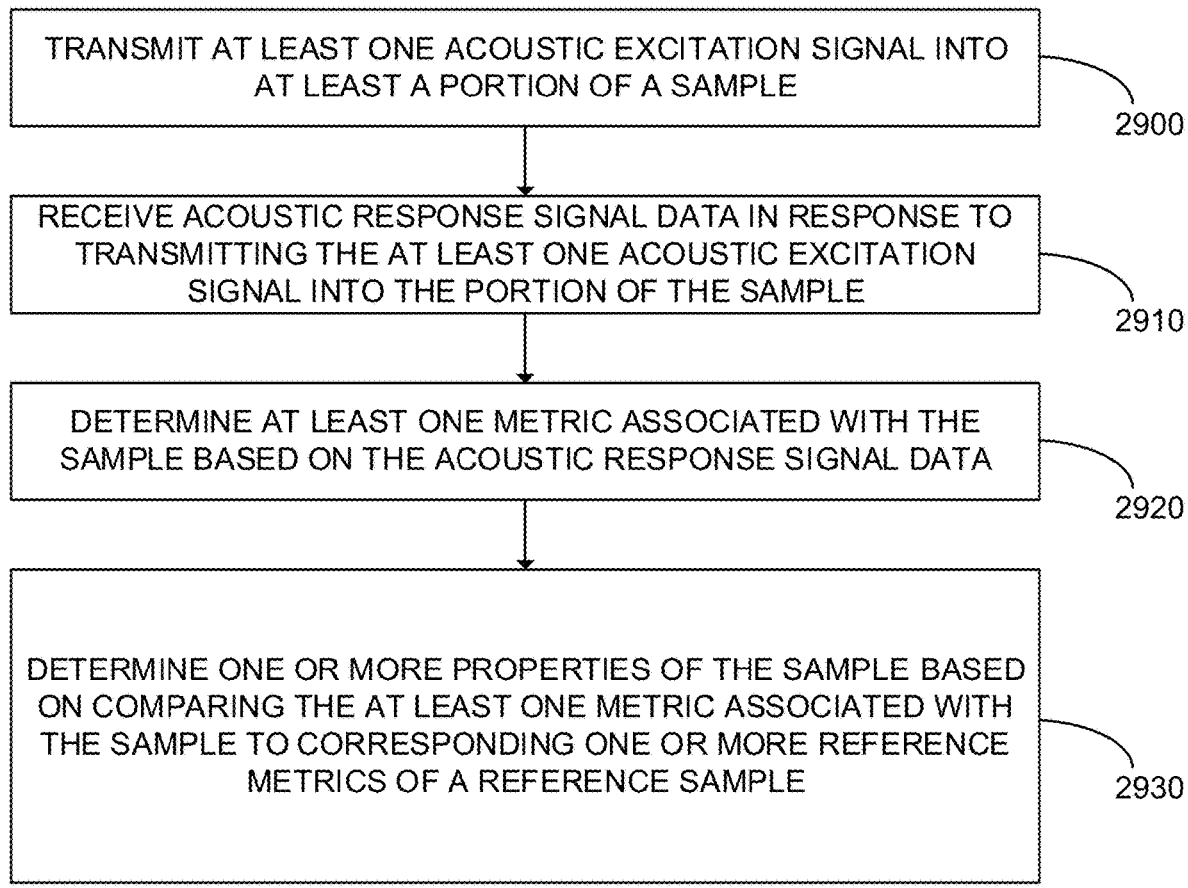
FIG. 29 is an example method of acoustic signal based analysis according to an aspect of the present disclosure.

FIG. 29 is an example method of acoustic signal based analysis according to an aspect of the present disclosure. FIG. 29 will be described with reference to FIG. 1 and the components thereof.

At step 2900, at least one acoustic excitation signal may be transmitted into at least a portion of a sample such as sample 102 of FIG. 1. The sample may include a sheet or a film associated with a component of a battery, as described above. In one example, the excitation signal(s) may be transmitted into the sample using at least one transducer such as the transducer 104 of FIG. 1.

At Step 2910, acoustic response signal data may be received in response to transmitting the at least one acoustic excitation signal into the portion of the sample. In some examples, the acoustic response signal data may be collected via at least one transducer such as the transducer 106 of FIG. 1. In one example, the acoustic response signal data may be obtained based on an acoustic signal based spatial analysis of the sample across a two-dimensional area of the sample.

In one example, the acoustic response signal data may be collected from two or more portions of the sample at two or more points in time, by moving the sample such that the two or more portions of the sample contact the at least one transducer at two or more points in time or are within a threshold proximity of the at least one transducer.

In one example, the sample is moved using one or more rollers, with at least one of the one or more rollers housing the at least one transducer. In another example, the sample is moved using one or more wedges, with at least one of the one or more wedges housing the at least one transducer. In one example, the at least one acoustic excitation signal is transmitted using wave guides and/or the acoustic response signal data is received using the wave guides. The wave guides may be disposed in one or more wedges or one or more rollers for moving the sample.

In one example, acoustic signals transmitted into the sample and/or received by the at least one transducer may be generated/controlled by acoustic pulser/receiver 108 of FIG. 1.

At step 2920, at least one metric associated with the sample may be determined based on the acoustic response signal data received at step 2910. In one example the at least one metric may be determined using the processor 110 of FIG. 1, which may be configured to execute computer-readable instructions stored in one or more associated memories (not shown in FIG. 1) that are communicatively coupled to the processor 110.

In one example, the at least one metric determined at step 2920 includes shift in time of flights of acoustic signals passing through the sample and the reference sample; similarity or dissimilarity in acoustic signal data based on the acoustic signal based analysis performed on the sample comprising a damaged sample and the reference sample, the reference sample including a pristine, nominal, or expected sample; centroid frequencies; or root-mean-square amplitudes of the acoustic signal data.

At step 2930, one or more properties of the sample may be determined, by the processor 110, based on comparing the at least one metric associated with the sample to corresponding one or more reference metrics of a reference sample. In one example, the sample includes a separator used in the battery and the one or more properties include one or more parts of the separator that are damaged, have holes, have tears, or folds; one or more production inhomogeneities including polymer agglomerates, large pores, or contaminant particles; porosity; mass loading; thickness; and/or uniformity.

In another example, the sample includes an electrode used in the battery and the one or more properties include calendared and/or uncalendared electrode coating inconsistency in porosity, local density, mass loading, particle agglomeration, or particle size distributions; cohesion between active material, conductive additive, and binder; damages comprising voids, scratches, or cracks; foreign inclusion comprising bubbles and contaminant particles including metallic or non-metallic particles; delamination or flaking of electrode coating; debonding between electrode coating and metal current collectors; adhesion between Current Collector and coating; and/or subsurface variations in porosity or density.

In another example, the sample includes a battery pouch packaging and the one or more properties include damages including pinholes or improper seals resulting in leaks in cell sealing foil; or damages including inconsistent, non-uniform or missing areas of polymer melt adhesive layer (typically PP/PPa per DNP product literature), Nylon protective layer, aluminum foil layer, and/or PET protective layer.

In another example, the sample includes a current collector and the one or more properties include folds, cracks, holes, and bends in the current collector before electrode coating is applied, after electrode active materials are coated, after drying, and/or after calendering.

In one example, the one or more corresponding metrics of the reference sample are metrics for a pristine, nominal, or expected sample. In another example, the at least one metric includes one or more of: a time-of-flight, spectral centroid, a first trough magnitude vs centroid frequency spread, and/or sample signal intensities.

In one example, the processor 110 may aggregate the at least one metric into a thin-film quality index to aid in the comparison at step 2930.

In one example, the sample and the reference sample include one or more of single-side coated cathodes or anodes, current collectors, and/or double-side coated electrodes.

In one example, the acoustic signal based analysis, according to steps 2900 through 2930, may be performed on the sample during a process of coating the sample in a step-wise manner by performing the acoustic signal based analysis on a thin-film prior to coating being applied; performing the acoustic signal based analysis on a first side of the thin-film upon a wet slurry coating being applied on the first side of the thin-film; performing the acoustic signal based analysis on a second side of the thin-film upon a wet slurry coating being applied on the second side of the thin-film; and performing the acoustic signal based analysis on the first side and the second side of the thin-film upon the wet slurry coatings on the first side and the second side of the thin-film being dried in a drying oven.

In some examples, the methods described herein (e.g., method 2900 and/or any other methods described herein) may be performed by a computing device or apparatus. In one example, the method 2900 can be performed by system 100 of FIG. 1. The computing device can include any suitable device, such as a server computer, a desktop computing device, a tablet computing device, a laptop computing device, a mobile device (e.g., a mobile phone), a wearable device (e.g., a VR headset, an AR headset, AR glasses, a network-connected watch or smartwatch, or other wearable device), a robotic device, and/or any other computing device with the resource capabilities to perform the processes described herein, including the method 2900 and/or any other method described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, memory, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The method 2900 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 2900 and/or other methods described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, an aspect of the present disclosure can include a computer-readable media embodying a method of electrochemical-acoustic signal interrogation (EASI) of one or more battery cells or one or more battery components. Accordingly, the present disclosure is not limited to illustrated examples and any means for performing the functionality described herein are included in aspects of the present disclosure.

While the foregoing disclosure shows illustrative aspects of the present disclosure, it should be noted that various changes and modifications could be made herein without departing from the scope of the present disclosure as defined by the appended claims. The functions, steps and/or actions of the method claims in accordance with the aspects of the present disclosure described herein need not be performed in any particular order. Furthermore, although elements of the present disclosure may be described or claimed in the singular, the plural is contemplated unless limitation to the singular is explicitly stated.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Various aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices, servers, or other form factor computers, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of acoustic signal-based analysis, the method comprising:
    transmitting at least one acoustic excitation signal into at least a portion of a battery sheet during an electrode fabrication step as part of a battery manufacturing process;
    receiving acoustic response signal data in response to transmitting the at least one acoustic excitation signal into the portion of the battery sheet;
    determining at least one metric associated with the battery sheet based on the acoustic response signal data; and
    detecting one or more properties of the battery sheet based on comparing the at least one metric associated with the battery sheet to corresponding one or more reference metrics previously determined for at least one reference battery sheet,
    wherein the acoustic signal-based analysis is performed in-line with the electrode fabrication step and on a first side and a second side of the battery sheet after a coating is applied to the first side and the second side of the battery sheet, and
    the battery manufacturing process includes a plurality of steps subsequent to the electrode fabrication step before completion of the battery manufacturing process.

2. The method of claim 1, wherein receiving the acoustic response signal data comprises:
    obtaining, by at least one transducer, the acoustic response signal data from two or more portions of the battery sheet at two or more points in time, by moving the battery sheet such that the two or more portions of the battery sheet either (i) contact the at least one transducer at two or more points in time or (ii) are within a threshold proximity of the at least one transducer.

3. The method of claim 2, wherein the battery sheet is moved using one or more rollers, with at least one of the one or more rollers housing the at least one transducer.

4. The method of claim 2, wherein the battery sheet is moved over one or more wedges, with at least one of the one or more wedges housing the at least one transducer.

5. The method of claim 2, wherein at least one of:
    the at least one acoustic excitation signal is transmitted using wave guides; or
    the acoustic response signal data is received using the wave guides.

6. The method of claim 5, wherein the wave guides are disposed in one or more wedges or one or more rollers for moving the battery sheet.

7. The method of claim 1, further comprising:
    obtaining the acoustic response signal data based on an acoustic signal-based spatial analysis of the battery sheet across a two-dimensional area of the battery sheet.

8. The method of claim 1, wherein the at least one metric comprises one or more of:
    shift in time of flights of acoustic signals passing through the battery sheet and the at least one reference battery sheet;
    similarity or dissimilarity in acoustic signal data based on the acoustic signal-based analysis performed on the battery sheet comprising a damaged sample and the at least one reference battery sheet; and
    centroid frequencies; or root-mean-square amplitudes of the acoustic signal data.

9. The method of claim 1, wherein the battery sheet is a separator used in a battery and the one or more properties comprise at least one of:
    one or more parts of the separator that are damaged, have holes, have tears, or folds;
    one or more production inhomogeneities including polymer agglomerates, large pores, or contaminant particles;
    porosity;
    mass loading;
    thickness; or uniformity.

10. The method of claim 1, wherein the battery sheet corresponds to an electrode used in a battery and the one or more properties comprise at least one of:
    calendared or uncalendared electrode coating inconsistency in porosity, local density, mass loading, particle agglomeration, or particle size distributions;
    cohesion between active material, conductive additive, and binder;
    damages comprising voids, scratches, or cracks;
    foreign inclusion comprising bubbles and contaminant particles including metallic or non-metallic particles;
    delamination or flaking of electrode coating;
    debonding between electrode coating and metal current collectors;
    adhesion between Current Collector and coating; or subsurface variations in porosity or density.

11. The method of claim 1, wherein the acoustic signal-based analysis is performed on the battery sheet during the electrode fabrication step by:
    performing the acoustic signal-based analysis on a thin-film prior to coating being applied, the thin-film being the battery sheet;
    performing the acoustic signal-based analysis on a first side of the thin-film upon a wet slurry coating being applied on the first side of the thin-film;
    performing the acoustic signal-based analysis on a second side of the thin-film upon a wet slurry coating being applied on the second side of the thin-film; and
    performing the acoustic signal-based analysis on the first side and the second side of the thin-film upon the wet slurry coating on the first side and the second side of the thin-film being dried in a drying oven.

12. The method of claim 1, wherein the battery sheet is a battery pouch packaging and the one or more properties comprise:
    damages including pinholes or improper seals resulting in leaks in cell sealing foil; or
    damages including inconsistent, non-uniform or missing areas of polymer melt adhesive layer, Nylon protective layer, aluminum foil layer, or PET protective layer.

13. The method of claim 1, wherein the battery sheet corresponds to a current collector and the one or more properties comprise:
    one or more of folds, cracks, holes, and bends in the current collector before electrode coating is applied, after electrode active materials are coated, after drying, or after calendering.

14. The method of claim 1, wherein the at least one metric comprises one or more of:
- a time-of-flight,
- spectral centroid,
- a first trough magnitude vs centroid frequency spread, or
- signal intensities.

15. The method of claim 1, further comprising:
aggregating the at least one metric into a thin-film quality index for comparing the at least one metric associated with the battery sheet to the corresponding one or more reference metrics of the at least one reference battery sheet.

16. The method of claim 1, wherein the battery sheet and the at least one reference battery sheet each comprise one or more of single-side coated cathodes or anodes, current collectors, or double-side coated electrodes.

17. An apparatus configured to perform an acoustic signal-based analysis in-line with an electrode fabrication step as part of a battery manufacturing process, the apparatus comprising:
a plurality of transducers installed in-line with the electrode fabrication step;
one or more memories having computer-readable instructions stored therein;
one or more processors communicatively coupled to the plurality of transducers and configured to execute the computer-readable instructions to:
control the plurality of transducers to:
transmit at least one acoustic excitation signal into at least a portion of a battery sheet during the electrode fabrication step;
receive acoustic response signal data in response to transmitting the at least one acoustic excitation signal into the portion of the battery sheet;
determine at least one metric associated with the battery sheet based on the acoustic response signal data; and
detect one or more properties of the battery sheet based on comparing the at least one metric associated with the battery sheet to corresponding one or more reference metrics previously determined for at least one reference battery sheet,
wherein the acoustic signal-based analysis is performed in-line with the electrode fabrication step and on a first side and a second side of the battery sheet after a coating is applied to the first side and the second side of the battery sheet, and
wherein the battery manufacturing process includes a plurality of steps subsequent to the electrode fabrication step before completion of the battery manufacturing process.

18. The apparatus of claim 17, wherein the acoustic signal-based analysis is performed on the battery sheet during the electrode fabrication step by:
performing the acoustic signal-based analysis on a thin-film prior to coating being applied, the thin-film being the battery sheet;
performing the acoustic signal-based analysis on a first side of the thin-film upon a wet slurry coating being applied on the first side of the thin-film;
performing the acoustic signal-based analysis on a second side of the thin-film upon a wet slurry coating being applied on the second side of the thin-film;
performing the acoustic signal-based analysis on the second side of the thin-film after calendaring the battery sheet; and
performing the acoustic signal-based analysis on the first side and the second side of the thin-film upon the wet slurry coating on the first side and the second side of the thin-film being dried in a drying oven.

19. One or more non-transitory computer-readable media comprising computer-readable instructions, which, when executed by an apparatus configured to perform an acoustic signal-based analysis in-line with an electrode fabrication step as part of a battery manufacturing process, cause the apparatus to:
transmit at least one acoustic excitation signal into at least a portion of a battery sheet;
receive acoustic response signal data in response to transmitting the at least one acoustic excitation signal into the portion of the battery sheet;
determine at least one metric associated with the battery sheet based on the acoustic response signal data; and
detect one or more properties of the battery sheet based on comparing the at least one metric associated with the battery sheet to corresponding one or more reference metrics previously determined for at least one reference battery sheet,
wherein the acoustic signal-based analysis is performed in-line with the electrode fabrication step and on a first side and a second side of the battery sheet after a coating is applied to the first side and the second side of the battery sheet, and
wherein the battery manufacturing process includes a plurality of steps subsequent to the electrode fabrication step before completion of the battery manufacturing process.

20. The one or more non-transitory computer-readable media of claim 19, wherein the acoustic signal-based analysis is performed on the battery sheet during the electrode fabrication step by:
performing the acoustic signal-based analysis on a thin-film prior to coating being applied, the thin-film being the battery sheet;
performing the acoustic signal-based analysis on a first side of the thin-film upon a wet slurry coating being applied on the first side of the thin-film;
performing the acoustic signal-based analysis on a second side of the thin-film upon a wet slurry coating being applied on the second side of the thin-film;
performing the acoustic signal-based analysis on the second side of the thin-film after calendaring the battery sheet; and
performing the acoustic signal-based analysis on the first side and the second side of the thin-film upon the wet slurry coating on the first side and the second side of the thin-film being dried in a drying oven.

* * * * *